(12) United States Patent
Arakawa

(10) Patent No.: US 12,294,678 B2
(45) Date of Patent: May 6, 2025

(54) IMAGE PROCESSING APPARATUS, CONTROL METHOD FOR IMAGE PROCESSING APPARATUS, AND NON-TRANSITORY STORAGE MEDIUM

(71) Applicant: CANON KABUSHIKI KAISHA, Tokyo (JP)

(72) Inventor: Junya Arakawa, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 17/208,836

(22) Filed: Mar. 22, 2021

(65) Prior Publication Data

US 2021/0209359 A1 Jul. 8, 2021

Related U.S. Application Data

(63) Continuation of application No. 16/282,200, filed on Feb. 21, 2019, now Pat. No. 10,984,233.

(30) Foreign Application Priority Data

Feb. 28, 2018 (JP) .................................. 2018-035310

(51) Int. Cl.
*H04N 1/00* (2006.01)
*G06V 30/10* (2022.01)
(Continued)

(52) U.S. Cl.
CPC ....... *H04N 1/00244* (2013.01); *G06V 30/147* (2022.01); *G06V 30/412* (2022.01);
(Continued)

(58) Field of Classification Search
CPC ... G06V 30/413; G06V 30/418; G06V 30/412
See application file for complete search history.

(56) References Cited

U.S. PATENT DOCUMENTS

2008/0117472 A1* 5/2008 Nohtomi ............. H04N 1/2175
358/403
2015/0302277 A1* 10/2015 Suzuki ................ G06V 10/235
382/229
(Continued)

FOREIGN PATENT DOCUMENTS

| JP | 2008-071050 A | 3/2008 |
| JP | 2011-15348 A | 1/2011 |
| JP | 2016-018454 A | 2/2016 |

*Primary Examiner* — Wassim Mahrouka
(74) *Attorney, Agent, or Firm* — Canon U.S.A., Inc. IP Division

(57) ABSTRACT

An apparatus acquires an image by reading a document, extracts a plurality of regions having a predetermined attribute from the acquired image, determines information about a registered document most similar to the acquired image from among information about a plurality of registered documents stored in a storage unit with use of positional information about the extracted plurality of regions, selects a processing target region in the acquired image based on a position of a processing target region previously specified with respect to the determined information about the most similar registered document, performs character recognition processing on the selected processing target region, and displays text data obtained by the character recognition processing.

14 Claims, 27 Drawing Sheets

(51) Int. Cl.
*G06V 30/146* (2022.01)
*G06V 30/412* (2022.01)
*G06V 30/413* (2022.01)
*G06V 30/418* (2022.01)

(52) U.S. Cl.
CPC .......... *G06V 30/413* (2022.01); *G06V 30/418* (2022.01); *H04N 1/00413* (2013.01); *G06V 30/10* (2022.01); *H04N 2201/0094* (2013.01)

(56) References Cited

U.S. PATENT DOCUMENTS

2016/0227066 A1* 8/2016 Shimazaki ............ G06V 30/412
2019/0197303 A1* 6/2019 Kanada ................ G06V 30/412

* cited by examiner

FIG.4

Order Form

November 1, 2015

Kabushiki Kaisha Nishitoride Hakusan Shokai

We would like to place an order as follows:   Order Number 123456 987

Delivery Time  October 25, 2015

| No. | | Quantity | Unit Price | Amount | Remarks |
|---|---|---|---|---|---|
| 1 | Manufacture Product / Commercial Product / Material Name 1 | 10 | 500 | 5,000 | |
| 2 | Manufacture Product / Commercial Product / Material Name 2 | 100 | 11,000 | ###### | |
| 3 | Manufacture Product / Commercial Product / Material Name 1 | 200 | 500 | 100,000 | |
| 4 | Manufacture Product / Commercial Product / Material Name 3 | 10 | 10,000 | 100,000 | |
| 5 | Manufacture Product / Commercial Product / Material Name 4 | 20 | 13,000 | 260,000 | |
| 6 | Manufacture Product / Commercial Product / Material Name 5 | 50 | 14,000 | 700,000 | |
| 7 | Manufacture Product / Commercial Product / Material Name 8 | 20 | 17,000 | 340,000 | |
| 8 | Manufacture Product / Commercial Product / Material Name 9 | 30 | 18,000 | 540,000 | |
| 9 | Manufacture Product / Commercial Product / Material Name 11 | 40 | 20,000 | 800,000 | |
| 10 | Manufacture Product / Commercial Product / Material Name 12 | 10 | 21,000 | 210,000 | |
| 11 | Manufacture Product / Commercial Product / Material Name 15 | 30 | 24,000 | 720,000 | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| Total Amount (including Consumption Tax) | | | | 4,875,000 | |

Issuer / Confirming Person

〒111-1111  Toride, Toride-shi, Ibaraki-ken
Kabushiki Kaisha Toride Shoji
Representative Director  Taro Ibaraki
TEL 1111-11-1111  FAX 1111-11-1111

FIG.5A

| | | | | |
|---|---|---|---|---|
| ID ------ | | | | ⚙ |
| 504 — File Name Assignment | | | Display URL | |
| Order Form_Kabushiki Kaisha Nishitoride Hakusan Shokai ~503 | | | | |
| [2] 502 [1] Order Form ~501 | | | November 1, 2015 | |
| Kabushiki Kaisha Nishitoride Hakusan Shokai | | | | |
| We would like to place an order as follows: | | | Order Number 123456 987 | |
| Delivery Time October 25, 2015 | | | | |

| No. | | Quantity | Unit Price | Amount | Remarks |
|---|---|---|---|---|---|
| 1 | Manufacture Product / Commercial Product / Material Name 1 | 10 | 500 | 5,000 | |
| 2 | Manufacture Product / Commercial Product / Material Name 2 | 100 | 11,000 | ###### | |
| 3 | Manufacture Product / Commercial Product / Material Name 1 | 200 | 500 | 100,000 | |
| 4 | Manufacture Product / Commercial Product / Material Name 3 | 10 | 10,000 | 100,000 | |
| 5 | Manufacture Product / Commercial Product / Material Name 4 | 20 | 13,000 | 260,000 | |
| 6 | Manufacture Product / Commercial Product / Material Name 5 | 50 | 14,000 | 700,000 | |
| 7 | Manufacture Product / Commercial Product / Material Name 8 | 20 | 17,000 | 340,000 | |
| 8 | Manufacture Product / Commercial Product / Material Name 9 | 30 | 18,000 | 540,000 | |
| 9 | Manufacture Product / Commercial Product / Material Name 11 | 40 | 20,000 | 800,000 | |
| 10 | Manufacture Product / Commercial Product / Material Name 12 | 10 | 21,000 | 210,000 | |
| 11 | Manufacture Product / Commercial Product / Material Name 15 | 30 | 24,000 | 720,000 | |
| 12 | | | | | |
| 13 | | | | | |
| 14 | | | | | |
| 15 | | | | | |
| 16 | | | | | |
| 17 | | | | | |

FIG.7A

Receipt

To Shimotsuruma Kabushiki Kaisha

¥ 972
We acknowledge to have received the above amount.

Shingakukai Service Kabushiki Kaisha
Address: 5-60-30, Omiya-ku, Saitama-shi, Saitama-ken
TEL: 03-330-8841
FAX: 03-330-8841

⎱ 901

| Product Code | Product Name | Unit Price | Number of Pieces | Unit | Individual Discount | Amount |
|---|---|---|---|---|---|---|
| 1001 | Oil-based Ballpoint Pen | ¥ 100 | 10 | Pen |  | ¥ 1,000 |
| 1002 | Water-based Ballpoint Pen | ¥ 100 | 10 | Pen | ¥ 100 | ¥ 900 |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  |  |  |  | ¥ – |
|  |  |  | Total Discount |  |  | ¥ 1,000 |
|  |  |  | Subtotal |  |  | ¥ 900 |
|  |  |  | Consumption Tax (8%) |  |  | ¥ 72 |
|  |  |  | Total |  |  | ¥ 972 |

| Remarks |
|---|
|  |

⎱ 902

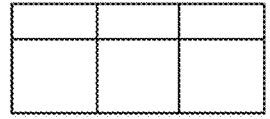

FIG.7B

Receipt

To Kensa Center Bumon Kabushiki Kaisha

¥ 78,732     Shochu Kabushiki Kaisha

We acknowledge to have received the above amount.

Address: 2001/5/1, Inumakata, Midori-ku, Saitama-shi, Saitama-ken
TEL: 03-220-2234
FAX: 03-220-2234

| Product Code | Product Name | Unit Price | Number of Pieces | Unit | Individual Discount | Amount |
|---|---|---|---|---|---|---|
| U001 | Office Ballpoint Pen | ¥ 100 | 10 | Pen | | ¥ 1,000 |
| U002 | Rollerball | ¥ 100 | 10 | Pen | ¥ 100 | ¥ 900 |
| U003 | Fountain Pen | ¥ 100 | 10 | Pen | | ¥ 1,000 |
| U004 | Felt Pen | ¥ 100 | 10 | Pen | | ¥ 1,000 |
| U005 | Dip Pen | ¥ 150 | 10 | Pen | | ¥ 1,500 |
| U006 | Work Ballpoint Pen | ¥ 100 | 10 | Pen | | ¥ 1,000 |
| U007 | Gel Ink Ballpoint Pen | ¥ 100 | 10 | Pen | | ¥ 1,000 |
| U008 | Highlighter Pen | ¥ 100 | 10 | Pen | | ¥ 1,000 |
| U009 | Technical Pen A | ¥ 100 | 10 | Pen | | ¥ 1,000 |
| U010 | Technical Pen B | ¥ 100 | 10 | Pen | | ¥ 1,000 |
| U011 | Technical Pen V | ¥ 100 | 10 | Pen | | ¥ 1,000 |
| U012 | Fineliner Pen A | ¥ 100 | 10 | Pen | | ¥ 1,000 |
| U013 | Fineliner Pen B | ¥ 100 | 10 | Pen | | ¥ 1,000 |
| U014 | Fineliner Pen C | ¥ 100 | 10 | Pen | | ¥ 1,000 |
| U015 | Drafting Pen Set | ¥ 1,500 | 10 | Set | | ¥ 15,000 |
| U016 | Drafting Pencil Set | ¥ 1,500 | 10 | Set | | ¥ 15,000 |
| U017 | Office Pen Set | ¥ 1,500 | 10 | Set | | ¥ 15,000 |
| U018 | Sample Pen | ¥ – | 10 | | | ¥ – |
| U002 | Rollerball | ¥ 100 | 10 | Pen | ¥ 100 | ¥ 900 |
| U003 | Fountain Pen | ¥ 100 | 10 | Pen | | ¥ 1,000 |
| U004 | Felt Pen | ¥ 100 | 10 | Pen | | ¥ 1,000 |
| U005 | Dip Pen | ¥ 150 | 10 | Pen | | ¥ 1,500 |
| U006 | Work Ballpoint Pen | ¥ 100 | 10 | Pen | | ¥ 1,000 |
| U007 | Gel Ink Ballpoint Pen | ¥ 100 | 10 | Pen | | ¥ 1,000 |
| U008 | Highlighter Pen | ¥ 100 | 10 | Pen | | ¥ 1,000 |
| U009 | Technical Pen A | ¥ 100 | 10 | Pen | | ¥ 1,000 |
| U010 | Technical Pen B | ¥ 100 | 10 | Pen | | ¥ 1,000 |
| U011 | Technical Pen V | ¥ 100 | 10 | Pen | | ¥ 1,000 |
| U012 | Fineliner Pen A | ¥ 100 | 10 | Pen | | ¥ 1,000 |
| U013 | Fineliner Pen B | ¥ 100 | 10 | Pen | | ¥ 1,000 |
| U014 | Fineliner Pen C | ¥ 100 | 10 | Pen | | ¥ 1,000 |
| U019 | Sample Fineliner Pen | ¥ – | 10 | | | ¥ – |
| U020 | Zebra Ink Pen | ¥ 550 | 1 | Pen | | ¥ 550 |
| U021 | Tombow Pen | ¥ 550 | 1 | Pen | | ¥ 550 |

| | |
|---|---|
| Total Discount | ¥ 1,000 |
| Subtotal | ¥ 72,900 |
| Consumption Tax (8%) | ¥ 5,832 |
| Total | ¥ 78,732 |

FIG.7C

Written Estimate

To Shiga Jimuki Kabushiki Kaisha

Estimated Amount  ¥   222,674

Subject Line: Estimate in November
Shipping Deadline: February 25, 2016
Shipping Location: As Previously Arranged
Payment Terms: Bank Transfer
Expiring Date: March 10, 2016

Kabushiki Kaisha Kosugi Sofuto

Address: 〒212-8530 3-4, Tsukagoshi, Saiwai-ku, Kawasaki-shi, Kanagawa-ken
TEL: 03-3758-21X
FAX: 03-3758-21X

— 905

| Product Code | Product Name | Unit Price | Number of Pieces | Unit | Individual Discount | Amount |
|---|---|---|---|---|---|---|
| 1001 | CF-C157 A3 (200 sheets × 3 bundles) (box) | ¥ 11,550 | 10 | Box | ¥ 10,000 | ¥ 105,500 |
| 1002 | Ink Tank BCI-37 1XLC Cyan | ¥ 1,230 | 10 | Tank | ¥ 3,000 | ¥ 9,300 |
| 1003 | Canon Calculator KS-1220TU (white) | ¥ 2,780 | 1 | Calculator | ¥ — | ¥ 2,780 |
| 1004 | PowerShot SX720 HS (black) | ¥ 44,800 | 2 | Camera | ¥ — | ¥ 89,600 |
|  |  |  |  |  |  | ¥ — |
|  |  |  |  |  |  | ¥ — |
|  |  |  |  |  |  | ¥ — |
|  |  |  |  |  |  | ¥ — |
|  |  |  |  |  |  | ¥ — |
|  |  |  |  |  |  | ¥ — |
|  |  |  |  |  |  | ¥ — |
|  |  |  |  |  |  | ¥ — |
|  |  |  |  |  |  | ¥ — |
|  |  |  |  |  |  | ¥ — |
|  |  |  |  |  |  | ¥ — |
|  |  |  | Total Discount |  |  | ¥ 1,000 |
|  |  |  | Subtotal |  |  | ¥ 206,180 |
|  |  |  | Consumption Tax (8%) |  |  | ¥ 16,494 |
|  |  |  | Total |  |  | ¥ 222,674 |

Remarks

You are requested to be liable for the bank transfer fee.

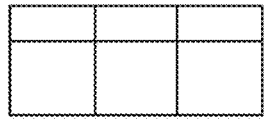

— 906

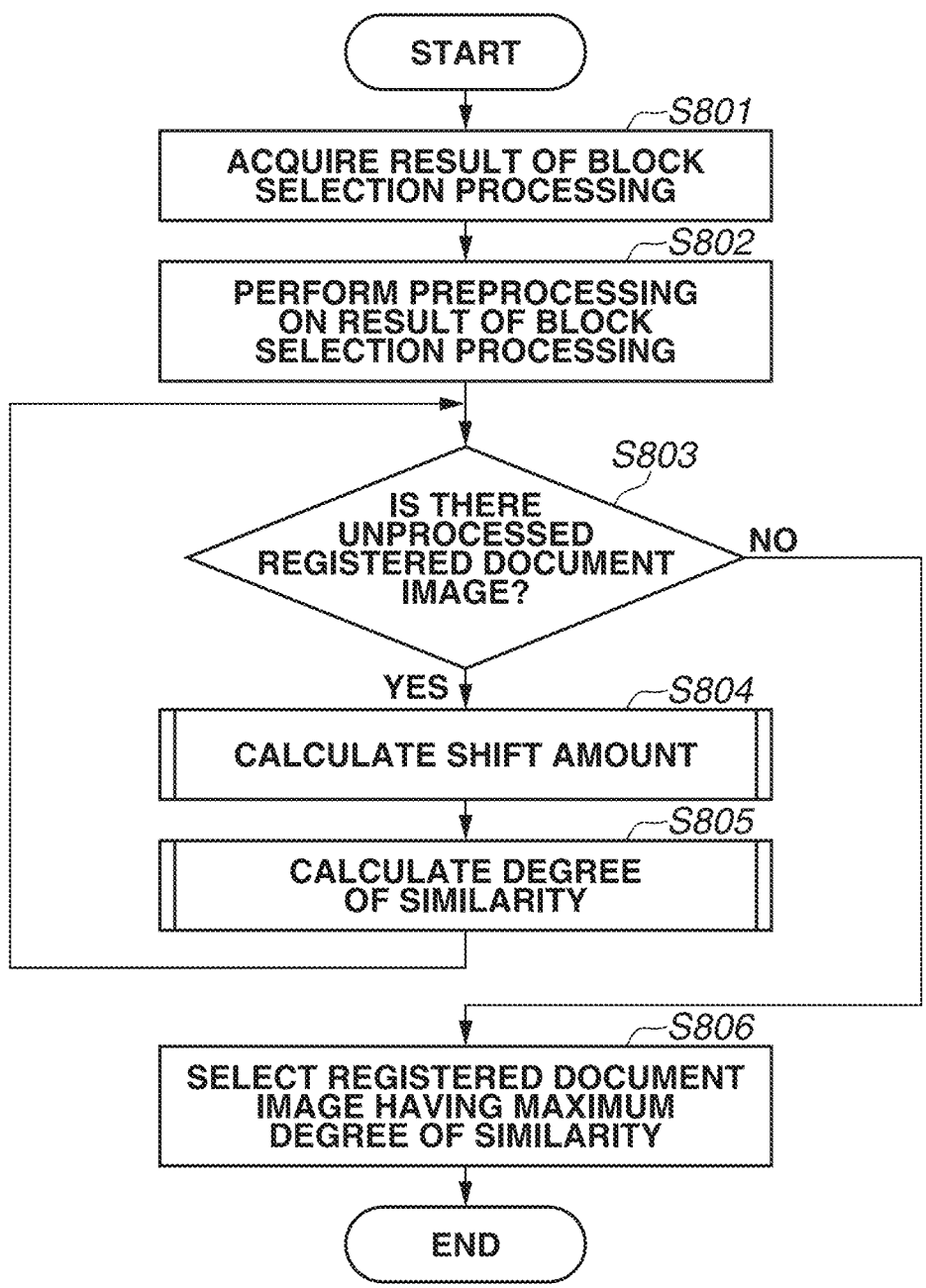

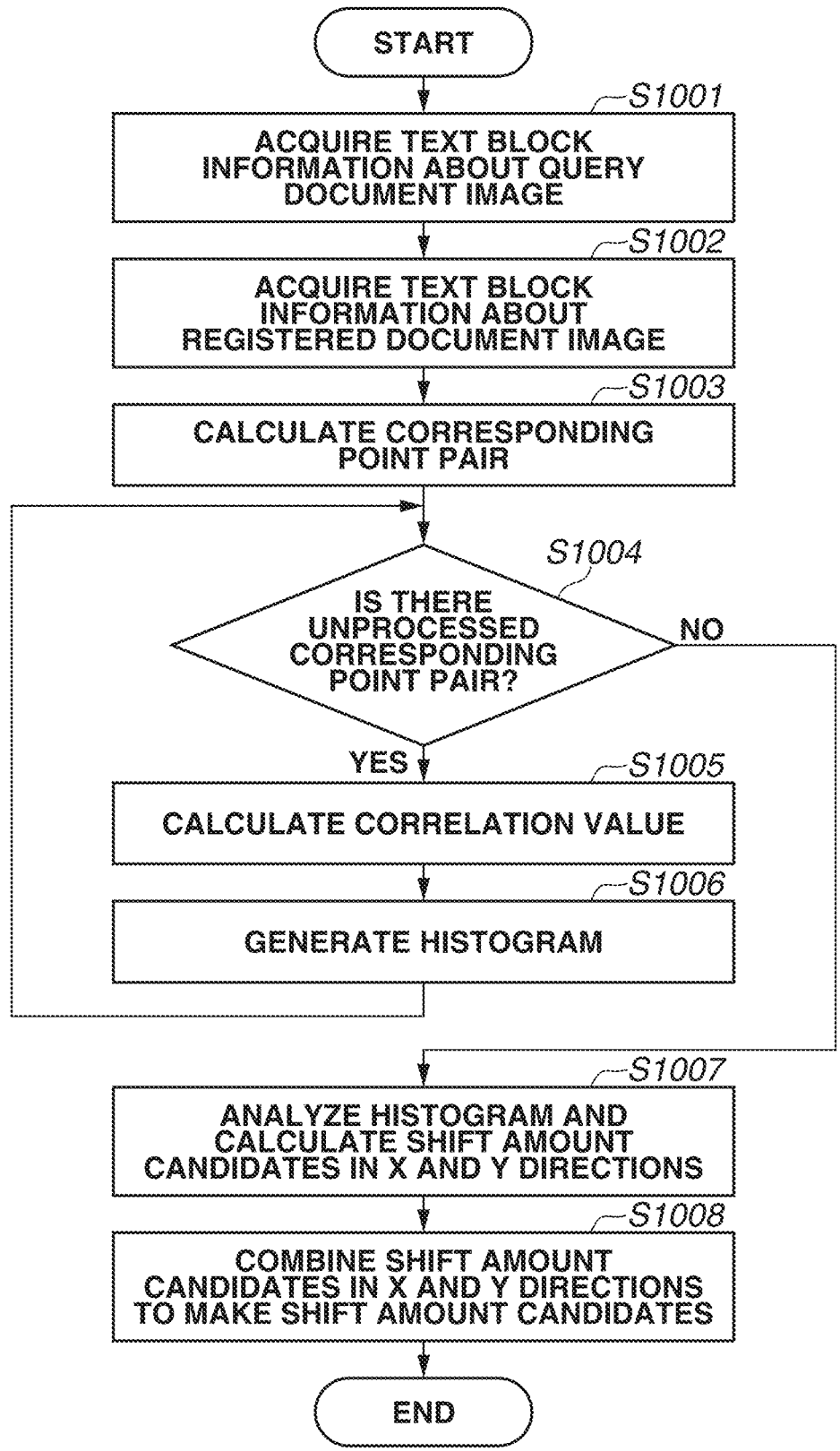

FIG.11A
|  |  | \multicolumn{6}{c}{THE NUMBER OF TEXT BLOCKS IN REGISTERED DOCUMENT IMAGE ASSOCIATED WITH A TEXT BLOCK IN QUERY DOCUMENT IMAGE} |
| --- | --- | --- | --- | --- | --- | --- | --- |
|  |  | One | Two | Three | Four | Five | Six or More |
| THE NUMBER OF TEXT BLOCKS IN QUERY DOCUMENT IMAGE ASSOCIATED WITH A TEXT BLOCK IN REGISTERED DOCUMENT IMAGE | One | 1.00 | 0.75 | 0.67 | 0.63 | 0.60 | 0.58 |
|  | Two | 0.75 | 0.50 | 0.42 | 0.38 | 0.35 | 0.33 |
|  | Three | 0.67 | 0.42 | 0.33 | 0.29 | 0.27 | 0.25 |
|  | Four | 0.63 | 0.38 | 0.29 | 0.25 | 0.23 | 0.21 |
|  | Five | 0.60 | 0.35 | 0.27 | 0.23 | 0.20 | 0.18 |
|  | Six or More | 0.58 | 0.33 | 0.25 | 0.21 | 0.18 | 0.17 |
FIG.11B
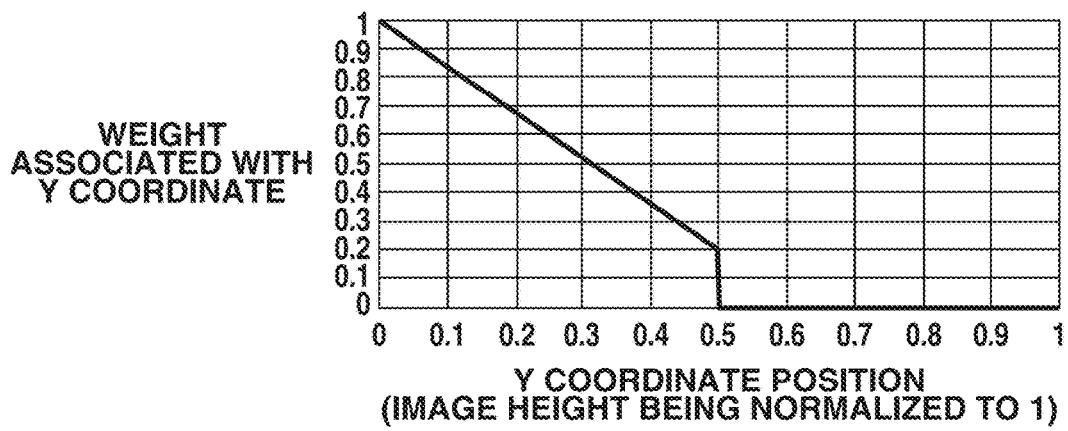
FIG.11C
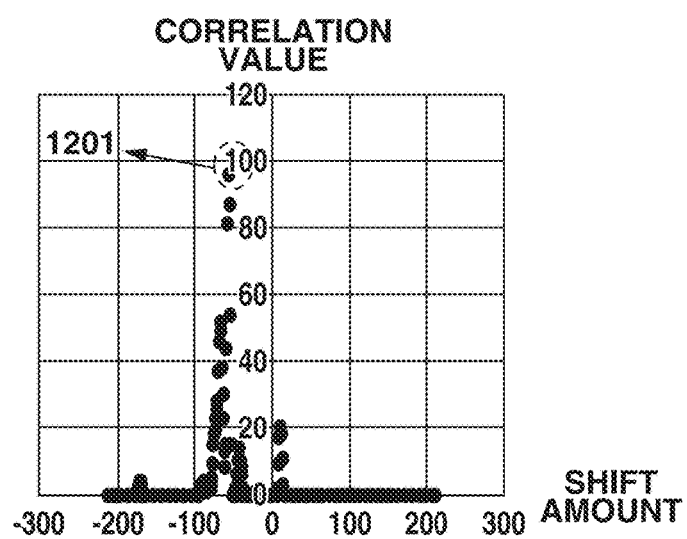

FIG.13A

| BLOCK ID | COORDINATES (x, y) | SIZE (x, y) | FILE NAME ASSIGNMENT RULE |
|---|---|---|---|
| 001 | (75, 25) | (45, 15) | 1 |
| 002 | (150, 35) | (50, 10) | 2 |
| 003 | (150, 45) | (50, 10) | |
| ... | ... | ... | ... |

FIG.13B

| BLOCK ID | COORDINATES (x, y) | SIZE (x, y) |
|---|---|---|
| 001 | (73, 22) | (45, 15) |
| 002 | (152, 34) | (45, 10) |
| 003 | (152, 46) | (45, 8) |
| ... | ... | ... |

FIG.13C

| TEXT BLOCK ID IN QUERY DOCUMENT IMAGE | TEXT BLOCK ID IN REGISTERED DOCUMENT IMAGE |
|---|---|
| 001 | 001 |
| 002 | 002, 003 |
| 003 | 003 |
| 004 | 004, 005, 006 |

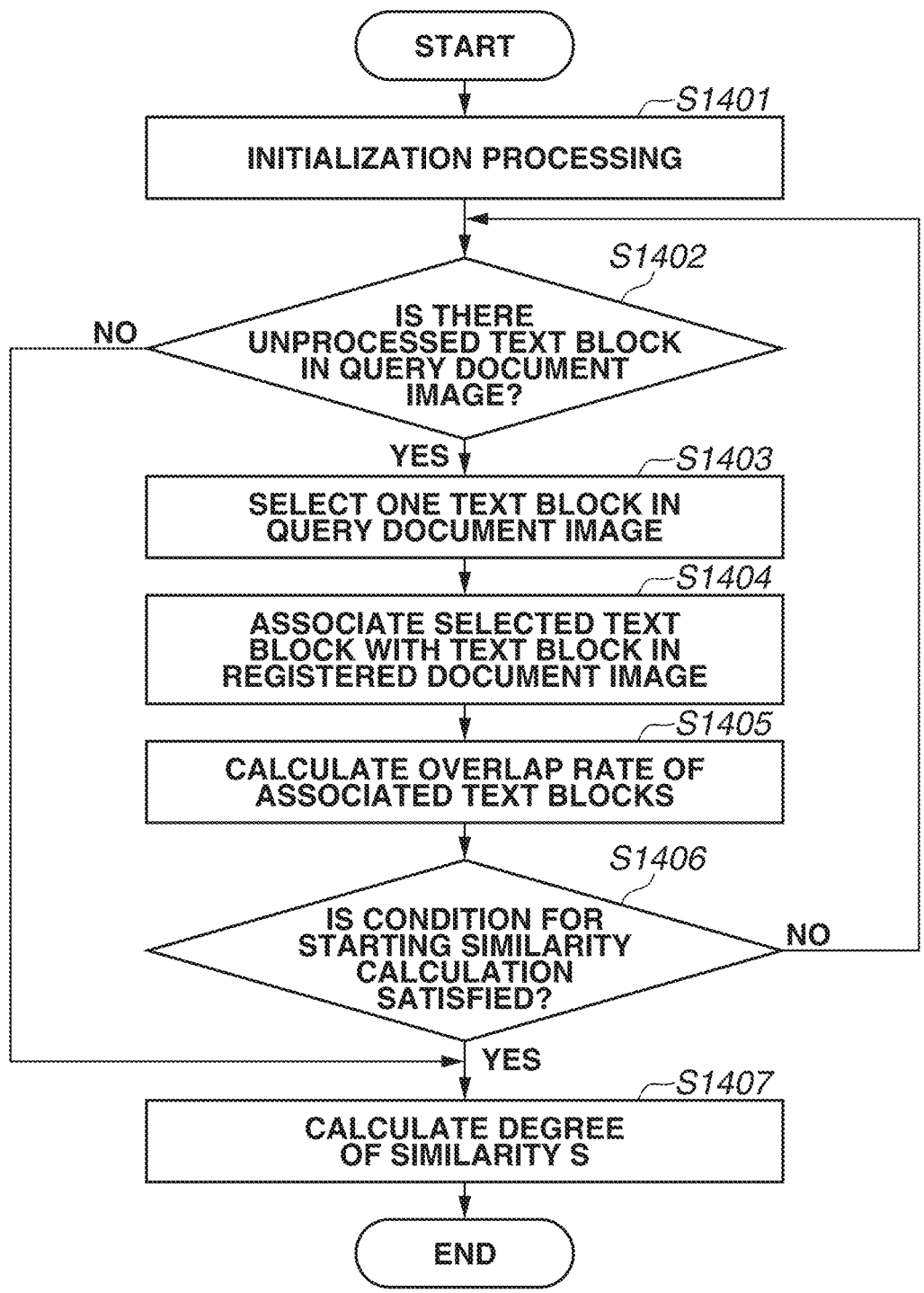

FIG.17A

2001 — Order Form  
2002  
November 1, 2015

Kabushiki Kaisha Nishitoride Hakusan Shokai  
We would like to place an order as follows:  Order Number 123456 987  
Delivery Time  October 25, 2015  
2003

| No. | | Quantity | Unit Price | Amount | Remarks |
|---|---|---|---|---|---|
| 1 | Manufacture Product / Commercial Product / Material Name 1 | 10 | 500 | 5,000 | |
| 2 | Manufacture Product / Commercial Product / Material Name 2 | 100 | 11,000 | ###### | |
| 3 | Manufacture Product / Commercial Product / Material Name 1 | 200 | 500 | 100,000 | |
| 4 | Manufacture Product / Commercial Product / Material Name 3 | 10 | 10,000 | 100,000 | |
| 5 | Manufacture Product / Commercial Product / Material Name 4 | 20 | 13,000 | 260,000 | |
| 6 | Manufacture Product / Commercial Product / Material Name 5 | 50 | 14,000 | 700,000 | |
| 7 | Manufacture Product / Commercial Product / Material Name 8 | 20 | 17,000 | 340,000 | |
| 8 | Manufacture Product / Commercial Product / Material Name 9 | 30 | 18,000 | 540,000 | |
| 9 | Manufacture Product / Commercial Product / Material Name 11 | 40 | 20,000 | 800,000 | |
| 10 | Manufacture Product / Commercial Product / Material Name 12 | 10 | 21,000 | 210,000 | |
| 11 | Manufacture Product / Commercial Product / Material Name 15 | 30 | 24,000 | 720,000 | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| Total Amount (including Consumption Tax) | | | | 4,875,000 | |

Issuer / Confirming Person

〒111-1111  Toride, Toride-shi, Ibaraki-ken  
Kabushiki Kaisha Toride Shoji  
Representative Director  Taro Ibaraki  
TEL 1111-11-1111  FAX 1111-11-1111

FIG.17B

Order Form — 2001  
2004  
November 1, 2015 — 2002

Kabushiki Kaisha Nishitoride Hakusan Shokai

We would like to place an order as follows:    Order Number 123456 987

Delivery Time  October 25, 2015

2003

| No. | | Quantity | Unit Price | Amount | Remarks |
|---|---|---|---|---|---|
| 1 | Manufacture Product / Commercial Product / Material Name 1 | 10 | 500 | 5,000 | |
| 2 | Manufacture Product / Commercial Product / Material Name 2 | 100 | 11,000 | ###### | |
| 3 | Manufacture Product / Commercial Product / Material Name 1 | 200 | 500 | 100,000 | |
| 4 | Manufacture Product / Commercial Product / Material Name 3 | 10 | 10,000 | 100,000 | |
| 5 | Manufacture Product / Commercial Product / Material Name 4 | 20 | 13,000 | 260,000 | |
| 6 | Manufacture Product / Commercial Product / Material Name 5 | 50 | 14,000 | 700,000 | |
| 7 | Manufacture Product / Commercial Product / Material Name 8 | 20 | 17,000 | 340,000 | |
| 8 | Manufacture Product / Commercial Product / Material Name 9 | 30 | 18,000 | 540,000 | |
| 9 | Manufacture Product / Commercial Product / Material Name 11 | 40 | 20,000 | 800,000 | |
| 10 | Manufacture Product / Commercial Product / Material Name 12 | 10 | 21,000 | 210,000 | |
| 11 | Manufacture Product / Commercial Product / Material Name 15 | 30 | 24,000 | 720,000 | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| Total Amount (including Consumption Tax) | | | | 4,875,000 | |

Issuer / Confirming Person

〒111-1111  Toride, Toride-shi, Ibaraki-ken  
Kabushiki Kaisha Toride Shoji  
Representative Director  Taro Ibaraki  
TEL 1111-11-1111  FAX 1111-11-1111

FIG.17C

Order Form (2001)  
(2002) November 1, 2015

Kabushiki Kaisha Nishitoride Hakusan Shokai  
We would like to place an order as follows:   Order Number 123456 987  
Delivery Time  October 25, 2015

| No. | | Quantity | Unit Price | Amount | Remarks |
|---|---|---|---|---|---|
| 1 | Manufacture Product / Commercial Product / Material Name 1 | 10 | 500 | 5,000 | |
| 2 | Manufacture Product / Commercial Product / Material Name 2 | 100 | 11,000 | ###### | |
| 3 | Manufacture Product / Commercial Product / Material Name 1 | 200 | 500 | 100,000 | |
| 4 | Manufacture Product / Commercial Product / Material Name 3 | 10 | 10,000 | 100,000 | |
| 5 | Manufacture Product / Commercial Product / Material Name 4 | 20 | 13,000 | 260,000 | |
| 6 | Manufacture Product / Commercial Product / Material Name 5 | 50 | 14,000 | 700,000 | |
| 7 | Manufacture Product / Commercial Product / Material Name 8 | 20 | 17,000 | 340,000 | |
| 8 | Manufacture Product / Commercial Product / Material Name 9 | 30 | 18,000 | 540,000 | |
| 9 | Manufacture Product / Commercial Product / Material Name 11 | 40 | 20,000 | 800,000 | |
| 10 | Manufacture Product / Commercial Product / Material Name 12 | 10 | 21,000 | 210,000 | |
| 11 | Manufacture Product / Commercial Product / Material Name 15 | 30 | 24,000 | 720,000 | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| Total Amount (including Consumption Tax) | | | | 4,875,000 | |

Issuer / Confirming Person

〒111-1111  Toride, Toride-shi, Ibaraki-ken  
(2005) Kabushiki Kaisha Toride Shoji  
Representative Director  Taro Ibaraki  
TEL 1111-11-1111  FAX 1111-11-1111

FIG.17D

*2001* — Order Form  *2006*
*2002* — November 1, 2015

Kabushiki Kaisha Nishitoride Hakusan Shokai

We would like to place an order as follows:   Order Number 123456 987
    Delivery Time  October 25, 2015

| No. | | Quantity | Unit Price | Amount | Remarks |
|---|---|---|---|---|---|
| 1 | Manufacture Product / Commercial Product / Material Name 1 | 10 | 500 | 5,000 | |
| 2 | Manufacture Product / Commercial Product / Material Name 2 | 100 | 11,000 | ###### | |
| 3 | Manufacture Product / Commercial Product / Material Name 1 | 200 | 500 | 100,000 | |
| 4 | Manufacture Product / Commercial Product / Material Name 3 | 10 | 10,000 | 100,000 | |
| 5 | Manufacture Product / Commercial Product / Material Name 4 | 20 | 13,000 | 260,000 | |
| 6 | Manufacture Product / Commercial Product / Material Name 5 | 50 | 14,000 | 700,000 | |
| 7 | Manufacture Product / Commercial Product / Material Name 8 | 20 | 17,000 | 340,000 | |
| 8 | Manufacture Product / Commercial Product / Material Name 9 | 30 | 18,000 | 540,000 | |
| 9 | Manufacture Product / Commercial Product / Material Name 11 | 40 | 20,000 | 800,000 | |
| 10 | Manufacture Product / Commercial Product / Material Name 12 | 10 | 21,000 | 210,000 | |
| 11 | Manufacture Product / Commercial Product / Material Name 15 | 30 | 24,000 | 720,000 | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| Total Amount (including Consumption Tax) | | | | 4,875,000 | |

Issuer / Confirming Person

*2007*

〒111-1111  Toride, Toride-shi, Ibaraki-ken
*2005* — Kabushiki Kaisha Toride Shoji
    Representative Director  Taro Ibaraki
  TEL 1111-11-1111  FAX 1111-11-1111

IMAGE PROCESSING APPARATUS, CONTROL METHOD FOR IMAGE PROCESSING APPARATUS, AND NON-TRANSITORY STORAGE MEDIUM

CROSS-REFERENCE TO RELATED APPLICATION

This application is a Continuation of U.S. application Ser. No. 16/282,200, filed Feb. 21, 2019, which claims priority from Japanese Patent Application No. 2018-035310 filed Feb. 28, 2018, which are hereby incorporated by reference herein in their entireties.

BACKGROUND OF THE INVENTION

Field of the Invention

Aspects of the embodiments generally relate to an image processing apparatus, a control method for an image processing apparatus, and a non-transitory storage medium.

Description of the Related Art

A paper document such as a business form may sometimes be scanned and converted into digital data by an image processing apparatus so as to be managed. In storing an image obtained by scanning a document, usually, a file name or meta-information corresponding to the type and content of the document is appended to the digitized document image, which is then stored in a predetermined folder.

In an image processing apparatus discussed in Japanese Patent Application Laid-Open No. 2011-15348, the user previously registers the format of a document to be scanned, a character string included in the document, and a setting used for copying or sending the document in association with each other. The image processing apparatus determines whether the document which has been scanned is a previously registered document based on the structure of image data obtained by scanning the document and a character string included in the obtained image data. In a case where the scanned document is a previously registered document, the image processing apparatus displays, as a recommended setting, the setting for copying or sending previously registered in association with the document.

More specifically, the image processing apparatus discussed in Japanese Patent Application Laid-Open No. 2011-15348 performs optical character recognition (OCR) processing on the image of a document obtained by performing scanning, and determines the type of the document with use of a character string included in the image of the document.

In some cases, a result of OCR processing of some character strings included in image data obtained by scanning a document may be used to append a file name or to compare a character string included in the document with a previously registered character string. In a case where processing such as mentioned above is performed, if OCR processing is performed on the entire image, since OCR processing is performed even on character strings which are not used as a file name or meta-information, it may take time before a result of OCR processing is displayed.

SUMMARY OF THE INVENTION

According to an aspect of the embodiments, an apparatus includes a memory that stores a program, and a processor that executes the program to acquire an image by reading a document, extract a plurality of regions having a predetermined attribute from the acquired image, determine information about a registered document most similar to the acquired image from among information about a plurality of registered documents stored in a storage unit with use of positional information about the extracted plurality of regions, select a processing target region in the acquired image based on a position of a processing target region previously specified with respect to the determined information about the most similar registered document, perform character recognition processing on the selected processing target region, and display text data obtained by the character recognition processing.

Further features of the disclosure will become apparent from the following description of exemplary embodiments with reference to the attached drawings.

BRIEF DESCRIPTION OF THE DRAWINGS

FIG. 4 is a schematic diagram illustrating an example of a query document image in the exemplary embodiment.

FIGS. 5A and 5B are diagrams each illustrating a screen which is displayed on a display in the exemplary embodiment.

FIGS. 7A, 7B, and 7C are schematic diagrams each illustrating a document which is to be scanned in the exemplary embodiment.

FIG. 8 is a flowchart illustrating processing for calculating a degree of similarity in the exemplary embodiment.

FIG. 9 is a flowchart illustrating processing for calculating a shift amount of the query document image in the exemplary embodiment.

FIGS. 11A, 11B, and 11C are diagrams illustrating information which is used to calculate the shift amount in the exemplary embodiment.

FIGS. 13A, 13B, and 13C are diagrams illustrating management tables for text blocks included in the registered document image and the query document image in the exemplary embodiment.

FIG. 14 is a flowchart illustrating processing for calculating a degree of similarity between the query document image and the registered document image in the exemplary embodiment.

FIGS. 17A, 17B, 17C, and 17D are schematic diagrams used to explain a region on which to perform block selection processing in the second exemplary embodiment.

DESCRIPTION OF THE EMBODIMENTS

Various exemplary embodiments, features, and aspects of the disclosure will be described in detail below with reference to the drawings. However, constituent elements described in these exemplary embodiments are merely examples, and are not intended to limit the scope of the disclosure.

Figure 1:
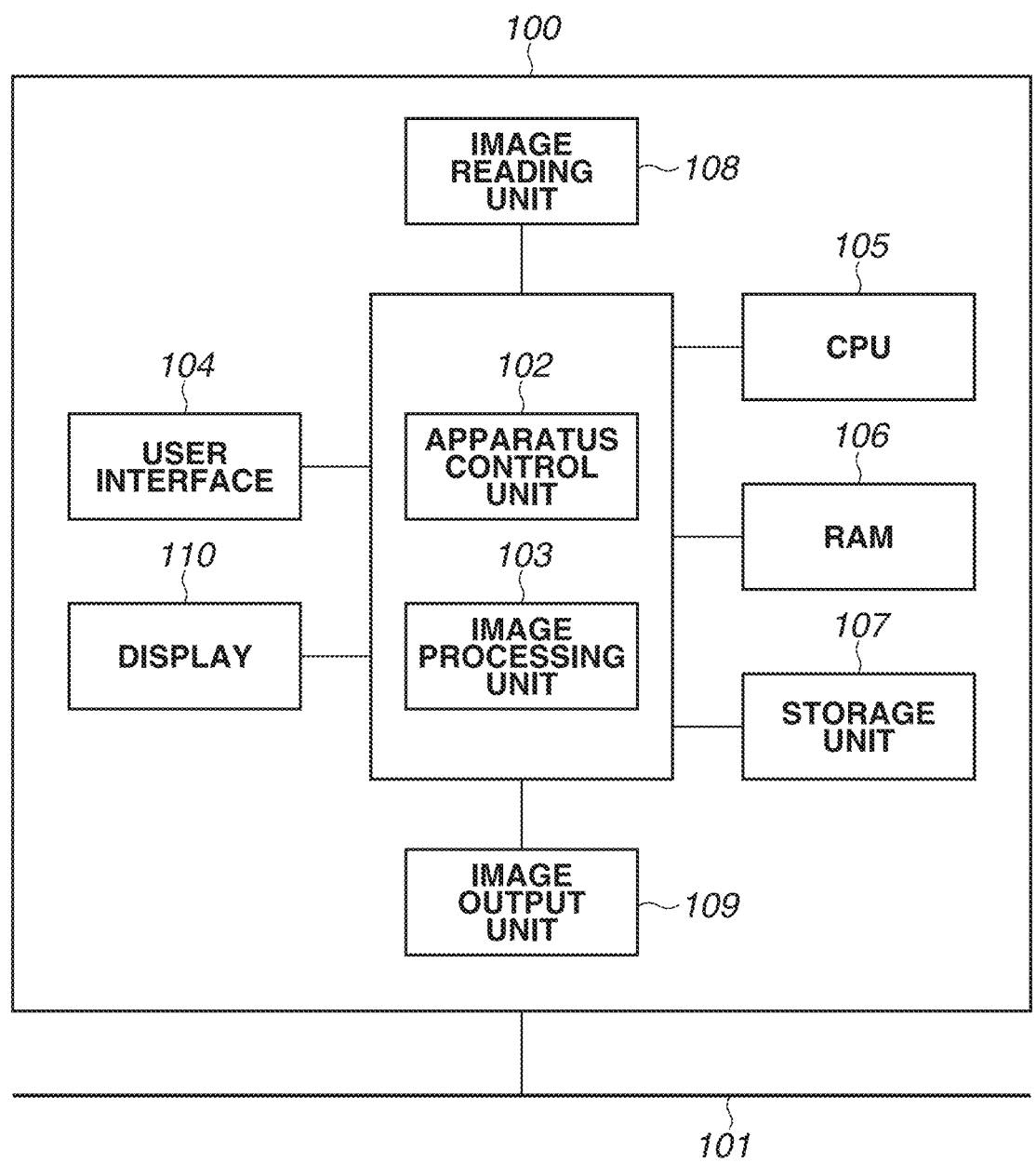
FIG. 1 is a block diagram illustrating an example of a hardware configuration of an image processing apparatus according to an exemplary embodiment.

FIG. 1 is a block diagram illustrating an example of a system configuration in a first exemplary embodiment of the disclosure. As illustrated in FIG. 1, a scan assist system for a document image in the present exemplary embodiment is implemented by an image processing apparatus 100.

The image processing apparatus 100 includes a user interface 104, a central processing unit (CPU) 105, a random access memory (RAM) 106, a storage unit 107, an image reading unit 108, an image output unit 109, and a display 110. Then, the respective units are interconnected via an apparatus control unit 102 in such a way as to be able to communicate with each other. Moreover, the image processing apparatus 100 includes an image processing unit 103, which is composed of an application specific integrated circuit (ASIC) that processes image data. The image processing apparatus 100 is configured to be connected to an external information processing apparatus (not illustrated) via a network 101. The user interface 104, which is composed of, for example, a keyboard, a mouse, and other input and output devices, allows the user to input various setting values or specified values thereto.

The CPU 105 reads out a main program from the storage unit 107 according to an initial program stored in the storage unit 107, and stores the main program in the RAM 106. The RAM 106 is used as a main memory for program storage or for work. Then, the CPU 105 controls the apparatus control unit 102 according to the main program.

The image reading unit 108, which is a scanner device, acquires image data by reading a document. Upon receiving image data from the image reading unit 108, the apparatus control unit 102 stores the received image data in the storage unit 107. Then, when performing scan assist processing, the apparatus control unit 102 reads out image data stored in the storage unit 107 onto the RAM 106. In the present exemplary embodiment, the scan assist processing is processing for recommending, to the user, information that is to be appended to the scanned image data. In the present exemplary embodiment, the information which the image processing apparatus 100 recommends to the user is a file name of image data obtained by reading a document. While, in the description of the present exemplary embodiment, the image processing apparatus 100 recommends a file name of image data, the image processing apparatus 100 can be configured to recommend a sending destination or storage destination of image data obtained by reading a document. Additionally, the image processing apparatus 100 can be configured to read a document such as a receipt and display an amount column of the read receipt.

To perform scan assist processing, the apparatus control unit 102 analyzes image data stored in the RAM 106 and generates information for scan assist processing. The analytical processing for performing scan assist processing includes the following three processing operations. The first processing operation is block selection processing (region determination processing) for extracting, as blocks, the respective regions of, for example, character strings, figures, and tables included in the image data. The second processing operation is matching processing for obtaining the degree of similarity between image data previously registered in the image processing apparatus 100 and image data obtained by newly scanning a document. The third processing operation is optical character recognition processing (OCR processing) for recognizing characters included in a character string block.

The apparatus control unit 102 performs processing for generating a user interface (UI) screen for scan assist processing with use of the generated information and displaying the generated UI screen on the display 110. Then, the apparatus control unit 102 sets a file name of image data obtained by scanning and reading a document based on an instruction from the user via the user interface 104. After that, the image processing apparatus 100 assigns the set file name to the image data and stores the image data with the file name assigned thereto in the storage unit 107.

The image output unit 109 outputs image data stored in the storage unit 107 in various formats according to control performed by the apparatus control unit 102. For example, the image output unit 109 is a printer device, and the image output unit 109 performs print processing for printing an image on paper based on control performed by the apparatus control unit 102. The image output unit 109 can have a transmitting function for image data and can transmit image data stored in the storage unit 107 based on control performed by the apparatus control unit 102.

The image processing apparatus 100 described above is an example of the present exemplary embodiment. An image processing apparatus 100 having a configuration that does not include the image output unit 109 from among the image reading unit 108 and the image output unit 109 can be employed. Moreover, some functions of the image processing apparatus 100 can be performed by an external processing apparatus connected via a network. The external processing apparatus can be a computer apparatus such as a server, and can be a cloud server on the Internet. Besides, if needed, the external processing apparatus can have another configuration.

Figure 2:
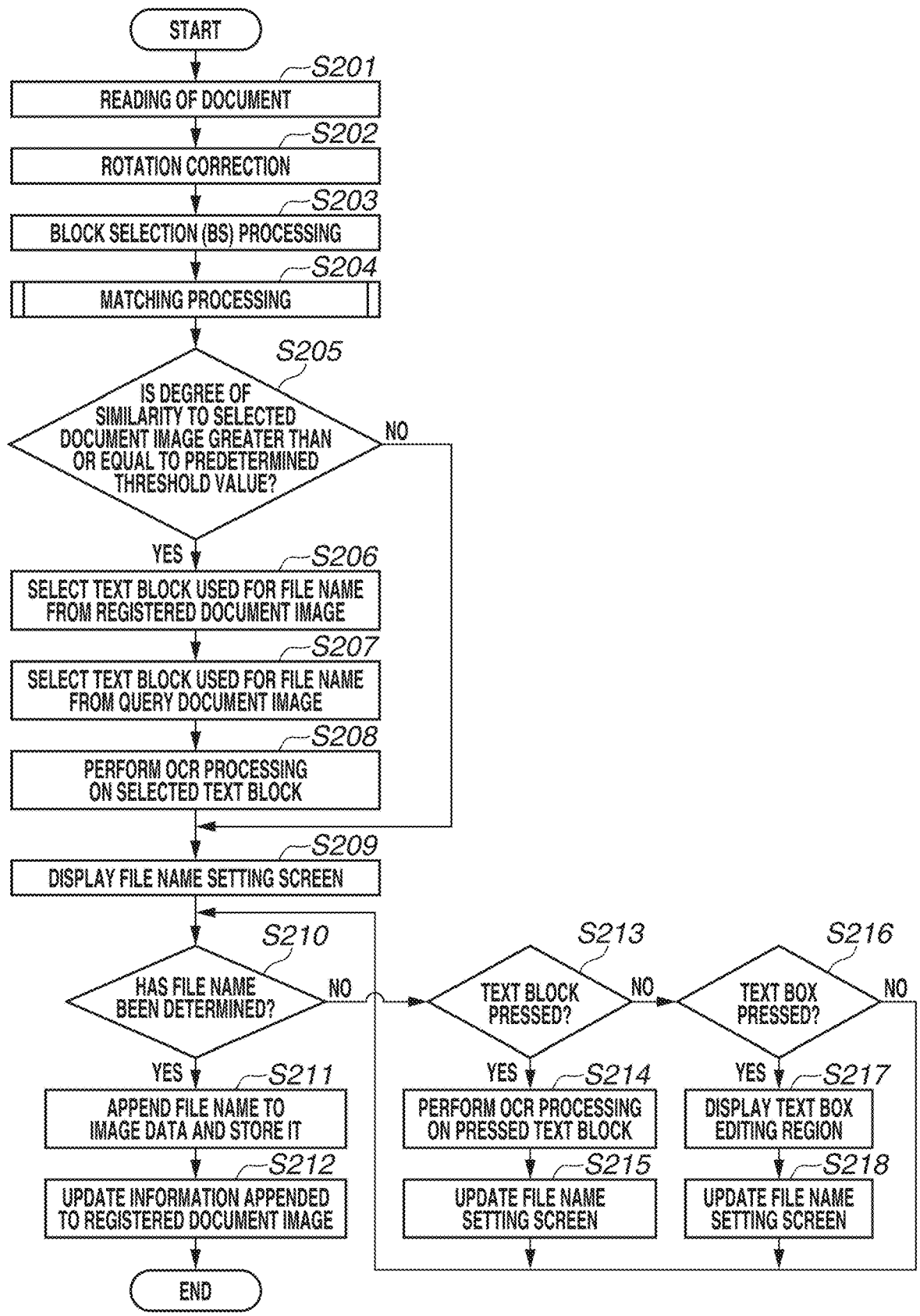
FIG. 2 is a flowchart illustrating processing which the image processing apparatus according to the exemplary embodiment performs.

Next, scan assist processing which the image processing apparatus 100 performs in the present exemplary embodiment is described with reference to the flowchart of FIG. 2. FIG. 2 is a flowchart of processing which is performed when the image processing apparatus 100 has scanned a document and has generated image data. The flow illustrated in FIG. 2 is performed by the image processing apparatus 100 receiving an instruction for scanning a document from the user via the user interface 104. A program for performing the processing illustrated in the flowchart of FIG. 2 is stored in the storage unit 107. The program stored in the storage unit 107 is loaded onto the RAM 106 and is then executed by the CPU 105.

Figure 3A:
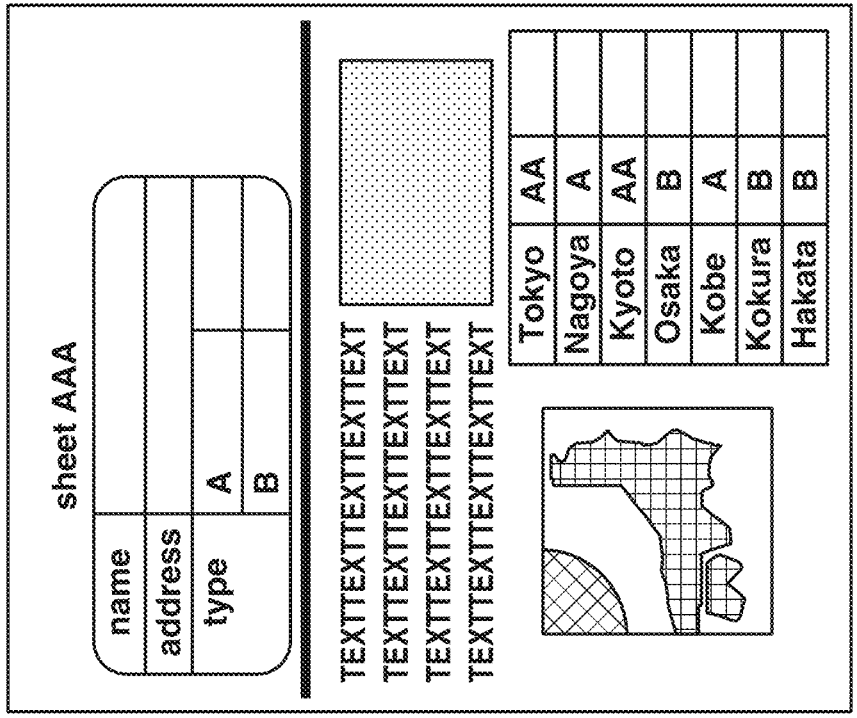
FIGS. 3A and 3B are schematic diagrams illustrating examples of image data obtained by scanning a document and a result of block selection processing.

First, in step S201, the CPU 105 causes the image reading unit 108 to read a document, thus generating image data. Furthermore, in step S201, the CPU 105 controls the image processing unit 103 to perform correction processing, such as color conversion processing and gradation correction, on the generated image data. After completing the processing for the image data, the CPU 105 stores the image data in the storage unit 107. Hereinafter, in the present exemplary embodiment, such image data is referred to as a "query document image". FIG. 3A illustrates an example of a query document image, which has been generated by the image reading unit 108 reading a document.

Next, in step S202, the CPU 105 reads out a query document image stored in the storage unit 107 onto the RAM 106 and performs rotation correction processing on the query document image. The rotation correction processing is processing for determining whether the query document image generated in step S201 is portrait-oriented image data or landscape-oriented image data and then correcting the top and bottom direction of the query document image. The CPU 105 rotates the query document image in such a manner that character strings or lines included in the query document image are horizontally aligned, thus determining the rotational angle of the query document image. For example, the CPU 105 takes projection histograms in various directions and selects, as the rotational angle, an angle corresponding to a histogram in which the peak and bottom of the histogram vibrate to a large extent with a short period. Since, usually, characters in a document are aligned horizontally or vertically, in a case where the query document image is oriented horizontally, the peak and bottom of the projection histogram are repeated with a short period.

Figure 3B:
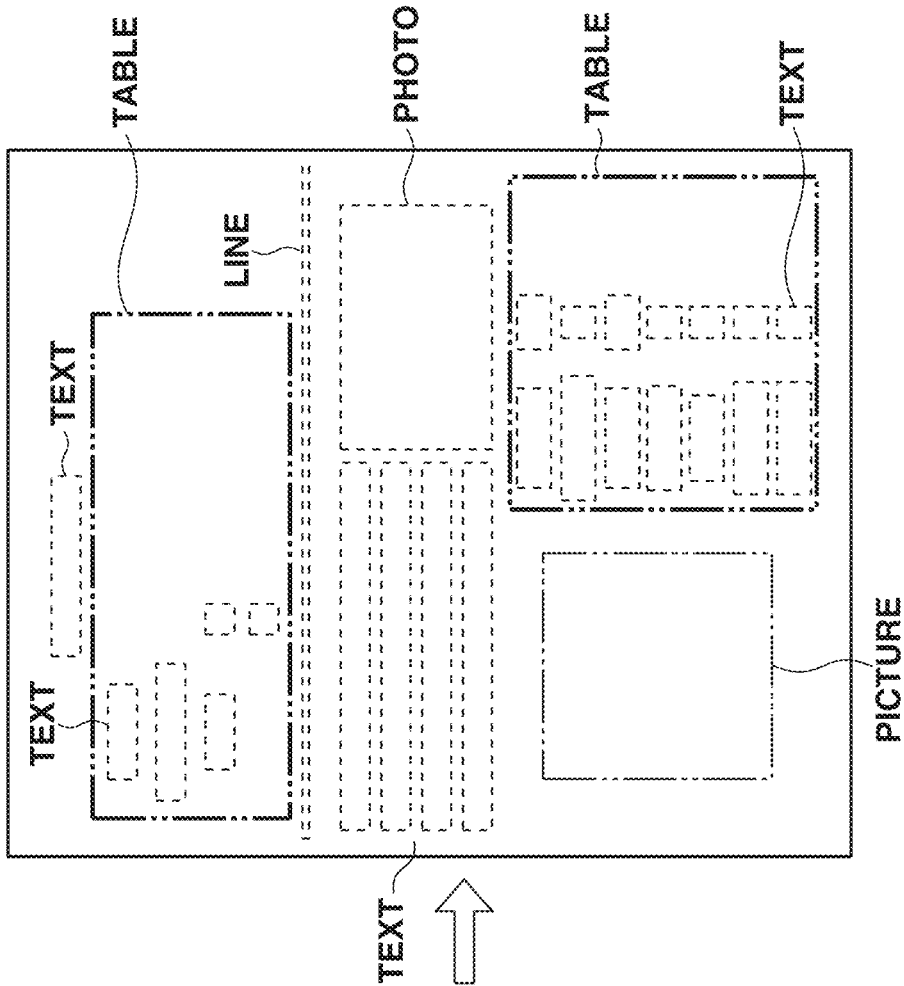

Next, in step S203, the CPU 105 performs block selection processing (BS processing) on the query document image. The block selection processing is processing for dividing a query document image into a plurality of regions and determining attributes of the respective blocks. The attributes of blocks include, for example, text (TEXT), picture (PICTURE), photo (PHOTO), line (LINE), and table (TABLE). FIG. 3B illustrates data obtained by performing block selection processing on the query document image illustrated in FIG. 3A. In FIG. 3B, each single rectangle surrounded by a dashed line is a block, and an attribute is assigned to each block.

It is assumed that a known method is used as the method for block selection processing. For example, the CPU 105 binarizes the query document image into black and white and extracts edges from the binarized image data. Then, the CPU 105 extracts a region surrounded by successive black pixels. In a case where the area of the extracted region is larger than a predetermined area, the CPU 105 further extracts, from the extracted region, a region in which while pixels are successive. In a case where the area of the extracted region surrounded by white pixels is larger than the predetermined area, the CPU 105 extracts once again, from such an extracted region, a region in which black pixels are successive. The CPU 105 repeats processing until the area surrounded by black pixels or white pixels becomes smaller than the predetermined area.

The CPU 105 classifies the regions obtained by the above-mentioned processing by size and shape, thus selecting attributes of the respective regions. For example, the CPU 105 determines that the attribute of a region the aspect ratio of which is close to 1 and the size of which is included in a predetermined range is text. Then, the CPU 105 groups regions which are determined to be text in attribute and are aligned into a block of character string (TEXT). For example, the CPU 105 groups a region determined to be text in attribute and a region located within a predetermined distance from the former region in the horizontal direction and determined to be text in attribute into a single block of character string.

In the present exemplary embodiment, a block of character string is referred to as a "text block". Moreover, the CPU 105 determines that a flattened cluster of pixels is a block of line (LINE). Additionally, the CPU 105 determines that a rectangle the size of which is larger than or equal to a predetermined size and which includes rectangular clusters of white pixels in a well-aligned manner is a block of table (TABLE), and determines that a region in which amorphous clusters of pixels are scattered is a block of photo (PHOTO). Then, the CPU 105 determines that a cluster of pixels which is not applicable to any of the above-mentioned regions is a block of picture (PICTURE). Attribute information about the respective blocks obtained by the block selection processing is used as information available for, for example, OCR processing and calculation of the degree of similarity (similarity calculation), which are described below.

Next, in step S204, the CPU 105 performs matching processing for selecting an image similar to the query document image from registered document images previously stored in the storage unit 107. The CPU 105 compares a plurality of registered document images stored in the storage unit 107 and the query document image with each other and calculates the degree of similarity with respect to each registered document image. Then, the CPU 105 selects a registered document image the calculated degree of similarity of which is maximum, as a registered document image serving as a matching candidate.

The registered document image is a document image previously stored in the storage unit 107 of the image processing apparatus 100. The storage unit 107 of the image processing apparatus 100 stores a plurality of registered document images. Then, the image processing apparatus 100 selects a registered document image the degree of similarity to the query document image of which is highest, as a matching candidate, from the registered document images stored in the storage unit 107.

Each registered document image has, appended thereto, information used for scan assist processing, such as a result of block selection processing performed on each piece of image data and a file name assignment rule for the image data. Pieces of information appended to each registered document image are managed with a table such as that illustrated in FIG. 13A. The table illustrated in FIG. 13A is a table indicating information about text blocks included in a registered document image. The column "block ID" indicates a number for identifying each text block. The column "coordinates (x, y)" indicates the coordinates of the upper left point of each text block. The column "size (x, y)" indicates the size in the horizontal direction (x-direction) and the vertical direction (y-direction) of each text block. The column "file name assignment rule" indicates information indicating whether each text block was used to assign a file name or what number-th time each text block was used to assign a file name. For example, referring to FIG. 13A, a text block of block ID 001 and a text block of block ID 002 are blocks which were used to assign a file name. Moreover, FIG. 13A indicates that a file name obtained by joining character strings in the order of block ID 001 and block ID 002 was used. With regard to the coordinates and the size, the upper left vertex of the query document image is set as an origin, the rightward direction along the query document image from the origin is set as the positive direction of the x-axis, and the downward direction along the query document image from the origin is set as the positive direction of the y-axis. As a point on the query document image is closer to the right side, the value of "x" becomes larger, and, as a point on the query document image is closer to the bottom side, the value of "y" becomes larger.

The CPU 105 reads out a registered document image from the storage unit 107 and stores the registered document image in the RAM 106. Then, the CPU 105 calculates the degree of similarity between the registered document image stored in the RAM 106 and the query document image. In the present exemplary embodiment, the degree of similarity between each registered document image and the query document image is calculated by processing described below. In the present exemplary embodiment, a registered document image which is stored in the storage unit 107 can be not a document image itself but, for example, a result of block selection processing of each document image. Moreover, after performing matching processing, the CPU 105 obtains correspondence information between the query document image and each registered document image and information about a naming rule for a file name of each registered document image. The correspondence information between the query document image and each registered document image is, for example, information indicating a correspondence in text block between each registered document image and the query document image.

Next, in step S205, the CPU 105 determines whether the degree of similarity of the query document image to the registered document image selected in step S204 is greater than or equal to a predetermined threshold value. In a case where the degree of similarity to the registered document image selected in step S204 is greater than or equal to the predetermined threshold value, the CPU 105 determines that the registered document image serving as a matching candidate selected in step S204 is an image that matches the query document image. On the other hand, in a case where the degree of similarity to the registered document image selected in step S204 is less than the predetermined threshold value, the CPU 105 determines that there is no registered document image that matches the query document image. If it is determined that there is a registered document image that matches the query document image (YES in step S205), the CPU 105 performs processing in step S206 and subsequent steps, and, if it is determined that there is no registered document image that matches the query document image (NO in step S205), the CPU 105 performs processing in step S209 and subsequent steps.

In step S206, the CPU 105 refers to information appended to the registered document image selected in step S204 and specifies a text block used to generate a file name from among the text blocks included in the registered document image. For example, the CPU 105 specifies the block ID of a text block used for file name assignment from the registered document image table illustrated in FIG. 13A.

Then, in step S207, the CPU 105 selects a text block corresponding to the specified text block from the query document image. Step S207 is performed to select a text block included in the query document image associated by a method described below with the text block specified in step S206. With the processing in steps S206 and S207 performed, the image processing apparatus 100 automatically selects a region used for displaying of a file name from the query document image.

In step S208, the CPU 105 performs character recognition processing on only the text block selected in step S207, thus generating text data. Specifically, the CPU 105 extracts an image of the text block portion selected in step S207 from the query document image and performs OCR processing on only such a partial image, thus generating text data. The applicable OCR processing includes various known methods such as that using a subspace method.

Next, in step S209, the CPU 105 generates scan assist information and displays, on the display 110, a file name setting screen for setting a file name together with the query document image. Then, the CPU 105 receives an operation performed by the user via the user interface 104. The image processing apparatus 100 described in the present exemplary embodiment performs OCR processing on only a portion used for a file name and displays a result of OCR processing. With this, the image processing apparatus 100 is able to display a result of OCR processing more quickly than in the case of performing OCR processing on all of the text blocks, so that it is possible to shorten the time required for recommendation of a file name of image data obtained by scanning a document.

Here, examples of the screen which is displayed on the display 110 in step S209 are described with reference to FIG. 4 and FIGS. 5A and 5B. FIG. 4 illustrates an example of a query document image obtained by the image reading unit 108 reading a document. Then, FIG. 5A illustrates an example of a screen which is displayed on the display 110 in a case where a registered document image matching the query document image is previously stored in the storage unit 107.

As illustrated in FIG. 5A, text blocks extracted from the query document image are displayed in gray, which is a background color. In FIG. 5A, there are some regions that are not displayed in gray as a background color. These regions are regions which have not been recognized as a text block in the processing performed in step S203.

In FIG. 5A, numbers are respectively appended to a text block 501 written as "Order Form" and a text block 502 written as "Kabushiki Kaisha Nishitoride Hakusan Shoukai". The text blocks 501 and 502 are text blocks used to generate a candidate for a file name among the text blocks included in the query document image. In the present exemplary embodiment, in step S208, OCR processing is performed on only the text blocks 501 and 502 among the text blocks included in the query document image, and a result of the OCR processing is displayed in step S209. Performing OCR processing on only a portion required for generation of a file name in the query document image enables shortening the time required before setting of a file name to be displayed. The number [1] attached to the upper left corner of the text block 501 indicates that a corresponding text block in the registered document image matching the query document image was selected as the first character string for the file name. The number [2] attached to the upper left corner of the text block 502 similarly indicates that a corresponding text block in the registered document image matching the query document image was selected as the second character string for the file name Therefore, in FIG. 5A, "Order Form" and "Kabushiki Kaisha Nishitoride Hakusan Shoukai", which are results of OCR processing performed on these two portions, are joined together with use of "_", so that "Order Form_Kabushiki Kaisha Nishitoride Hakusan Shoukai" is recommended in a text box 503. Furthermore, while, in the present exemplary embodiment, results of OCR processing performed on a plurality of character regions are joined together with use of "_", this delimiter character is not limited to "_", but can be another predetermined character (for example, "-"). When the user performs a tap operation on a file name assignment button 504, the CPU 105 appends the file name written in the text box 503 to the query document image and stores the query document image with the file name appended thereto in the storage unit 107. In a case where the user edits the file name, the user performs a tap operation on the text box 503. An operation for editing the recommended file name is described below with regard to steps S213 to S215.

Figure 5B:

Moreover, in step S205, in a case where there is no registered document image that matches the query document image, since OCR processing is not performed in any of the text blocks, a screen illustrated in FIG. 5B is displayed on the display 110. In a case where the screen illustrated in FIG. 5B is displayed on the display 110, the image processing apparatus 100 assigns a file name to the query document image based on an operation performed by the user.

In step S210, the CPU 105 determines whether a file name has been determined, depending on the user interface 104 receiving an operation performed by the user. In a case where the user has performed a tap operation on the file name assignment button 504, the CPU 105 determines that a file name has been determined (YES in step S210). In a case where the operation performed by the user is an operation different from pressing of the file name assignment button 504 (NO in step S210), the CPU 105 performs processing in step S213 and subsequent steps.

In a case where the user has performed a tap operation on the file name assignment button 504, then in step S211, the CPU 105 appends the file name displayed in the text box 503 to the query document image and stores such image data in the storage unit 107. While, in the present exemplary embodiment, image data is stored in the storage unit 107, image data can be transmitted to an external apparatus or image data can be stored in, for example, a server connected to the image processing apparatus 100. In that case, the image processing apparatus 100 causes the user to set, in addition to a file name, the transmission destination or storage location of image data.

After storing the image data, in step S212, the CPU 105 updates information appended to the registered document image stored in the storage unit 107. Specifically, in step S212, the CPU 105 updates information indicating a text block corresponding to what text block included in the registered document image the text block used for the file name appended to the stored image data is. For example, in a case where the text block used for file name assignment is different from that in the registered document image matching the query document image, the CPU 105 updates information about a text block used for file name assignment associated with the registered document image matching the query document image. Moreover, in a case where a character string other than character strings included in the text block has been used as a file name, the CPU 105 stores information about the appended character string in association with the registered document image in the storage unit 107. In a case where a file name recommended by the image processing apparatus 100 is directly used as a file name, the CPU 105 does not need to perform processing in step S212. After completing processing in step S212, the CPU 105 ends the processing illustrated in FIG. 2.

Next, processing performed in a case where a file name has not been determined in step S210 is described. The case where a file name has not been determined in step S210 is a case where the user has performed a tap operation on a portion other than the file name assignment button 504. For example, in a case where, in step S205, there is no registered document image matching the query document image and no character string is displayed in the text box 503, the user performs an operation on a portion other than the file name assignment button 504. Moreover, in a case where the user wants to use a file name different from the file name recommended by the image processing apparatus 100, the user also performs an operation on a portion other than the file name assignment button 504.

Next, in step S213, the CPU 105 determines whether a tap operation has been performed on a text block. Specifically, in step S213, the CPU 105 determines whether the user has performed a tap operation on a text block the background color of which is gray in the screen displayed on the display 110. If it is determined that the user has performed a tap operation on a text block (YES in step S213), the CPU 105 performs processing in step S214 and subsequent steps, and, if it is determined that the user has not performed a tap operation on a text block (NO in step S213), the CPU 105 performs processing in step S216 and subsequent steps.

In step S214, the CPU 105 performs OCR processing on the text block on which a tap operation has been performed. In a case where the text block on which the user has performed a tap operation is a text block on which OCR processing has already been performed and the text block is already associated with a result of the OCR processing, the CPU 105 does not perform OCR processing. The method for OCR processing to be performed on a text block is similar to that described in step S208. In step S214, the CPU 105 performs OCR processing on only a text block on which the user has performed a tap operation. In doing so, the CPU 105 is able to recognize a character string included in the selected text block in a shorter time than in the case of performing OCR processing on the entire query document image.

Figure 6A:
FIGS. 6A, 6B, 6C, 6D, and 6E are diagrams each illustrating an editing screen for a file name which is displayed on the display in the exemplary embodiment.
Figure 6B:

Then, in step S215, the CPU 105 updates the file name setting screen, which is displayed on the display 110, with use of a result of the OCR processing performed in step S214. For example, FIG. 6A illustrates a state in which a text block 601 has been selected from among the text blocks included in the query document image and "Order Form" has been displayed in a text box 701. Here, suppose that the user has performed a tap operation on a text block 702. In step S214, the CPU 105 performs OCR processing on a character string included in the text block 702. Then, in step S215, the CPU 105 displays [2] at the upper left of the text block 702, and displays "Kabushiki Kaisha Nishitoride Hakusan Shoukai" behind "Order Form" in the text box 701, as illustrated in FIG. 6B. After performing processing in step S215, the CPU 105 returns the processing to step S210.

In a case where no text block is selected in step S213, then in step S216, CPU 105 determines whether a tap operation has been performed on the text box 701. For example, in step S216, the CPU 105 determines whether the user has performed a tap operation on the text box 701. If it is determined that a tap operation has been performed on the text box 701 (YES in step S216), the CPU 105 performs processing in step S217 and subsequent steps, and, if it is determined that a tap operation has not been performed on the text box 701 (NO in step S216), the CPU 105 returns the processing to step S210.

Figure 6C:
Figure 6D:

In a case where, in step S216, it is determined that a tap operation has been performed on the text box 701, then in step S217, the CPU 105 displays, on the display 110, an editing region 704 for editing a character string displayed in the text box 701. FIG. 6C illustrates a screen which is displayed on the display 110 in step S217. The editing region 704 is used to display a character string which is currently input in the text box 701. A cursor 705 is a cursor indicating an editing portion in the character string. "OK" 706 is a button used to complete editing of a character string which is input in the text box 701. The user edits the character string with use of a keyboard and a mouse (both not illustrated) connected to the image processing apparatus 100. The CPU 105 can be configured to display a software keyboard together with the editing region 704 on the display 110. According to the user selecting the "OK" button 706, the CPU 105 advances the processing to step S218. FIG. 6D illustrates a state in which the user has deleted a character string "Kabushiki Kaisha" from the state illustrated in FIG. 6C.

Figure 6E:

According to the user performing a tap operation on the "OK" button 706, in step S218, the CPU 105 updates a file name setting screen which is displayed on the display 110. In FIG. 6D, when the user has performed a tap operation on the "OK" button 706, the CPU 105 displays a screen illustrated in FIG. 6E on the display 110. In the text box 701 in the screen illustrated in FIG. 6E, a character string "Order Form_Nishitoride Hakusan Shoukai" is displayed. Processing in step S210 and subsequent steps is similar to the above-described processing and is, therefore, omitted from description.

Thus, the image processing apparatus 100 ends the processing illustrated in FIG. 2. In the present exemplary embodiment, in step S208, the CPU 105 performs OCR processing on a portion selected in step S207 and, in step S214, the CPU 105 performs OCR processing on the text block selected in step S213. However, after, in step S208, performing OCR processing on a portion selected in step S207 and displaying a file name, the CPU 105 can perform, at any timing, OCR processing on a text block which is not yet subjected to OCR processing. In doing so, after selecting a text block in step S213, without performing OCR processing, the CPU 105 becomes able to display a character string included in the selected text block.

Thus far is the description of the entire flow in which the image processing apparatus 100 according to the present exemplary embodiment performs the scan assist processing.

Next, the matching processing performed in step S204 illustrated in FIG. 2 is described. While the processing to be described here is an example of processing for selecting a registered document image similar to a query document image, a configuration in which a registered document image similar to a query document image is selected by a known method or another method can be employed.

In the present exemplary embodiment, to specify a rule used for file name assignment in storing a query document image, the image processing apparatus 100 selects a registered document image similar to the query document image from among a plurality of registered document images stored in the storage unit 107.

In the present exemplary embodiment, the degree of similarity is a value meaning the similarity in structure between document images, such as position or size of a text block in each document image, and does not necessarily require the similarity in character string included in each document image. In a case where the same format is repeatedly used as in a business form, the structure of a document image, such as the position in which a character string is located, does not greatly change. On the other hand, character strings included in the respective document images may be different on a document-by-document basis. Therefore, even in a case where contents of character strings included in the respective document images are different, the image processing apparatus 100 selects a registered document image which is similar in the structure of a document image, such as the location of a text block, as a document image similar to a query document image.

For example, suppose that a query document image is an image illustrated in FIG. 7A and registered document images are images illustrated in FIG. 7B and FIG. 7C. Regions at upper portions of the business forms, such as regions 901, 903, and 905, are header portions of the business forms, on which information for identifying a document concerned, such as information about a title of the document and a preparer of the document and a destination of the document, is written. Such information written on the header portion at an upper portion of the business form is frequently used for file name assignment. Moreover, it is highly possible that business forms which are similar in the header portion are business forms which were prepared with use of the same format and file names are assigned thereto according to similar file name assignment rules. On the other hand, regions 902 and 904 are portions at which detailed contents of the respective document images are written, and are, for example, in the case of an order form, portions at which, for example, the name, the number of pieces, and the money amount of each product to be ordered are written. These regions are regions in which the number or locations of text blocks are changed depending on the contents to be written, even in documents which were prepared with use of the same format.

Therefore, in the present exemplary embodiment, since the query document image illustrated in FIG. 7A and the registered document image illustrated in FIG. 7B are not similar in structure of the region 902 and the region 904 but are similar in structure of the region 901 and the region 903, the image processing apparatus 100 treats these document images as images having a high degree of similarity. On the other hand, the query document image illustrated in FIG. 7A and the registered document image illustrated in FIG. 7C are similar to each other in the region 902 and the region 906 but are not similar in the respective header portions. At this time, the image processing apparatus 100 treats the query document image illustrated in FIG. 7A and the registered document image illustrated in FIG. 7C, which are not similar in the header portions, in which there are considered to be many text blocks used for file name assignment, as images having a low degree of similarity.

Details of the document matching processing performed in step S204 described above are described with reference to FIG. 8. As with FIG. 2, processing illustrated in the flowchart of FIG. 8 is performed by the CPU 105 loading program code stored in the storage unit 107 onto the RAM 106 and controlling the apparatus control unit 102 according to the program code.

First, in step S801, the CPU 105 acquires a result of block selection processing performed on the query document image from the RAM 106. The result of block selection processing includes the position, size, and attribute information about each block. The position of each block includes the coordinates of an upper left corner point of each block, and the size thereof includes information about, for example, the numbers of pixels in the vertical and horizontal directions of each block. Moreover, the attribute information about each block includes information indicating, for example, whether each block is a text block or a table block.

Next, in step S802, the CPU 105 performs preprocessing on the result of block selection processing of the query document image acquired in step S801. The preprocessing includes processing for extracting only text blocks from the blocks included in a document image or processing for performing sorting on the extracted text blocks from above to below in the document image. FIG. 13B illustrates a table indicating information about text blocks subjected to the preprocessing in step S802. This table is stored in the RAM 106. The table illustrated in FIG. 13B is a table in which the text blocks included in the query document image are arranged in order from above. Columns "Block ID", "Coordinates (x, y)" and "Size (x, y)" are similar to those illustrated in FIG. 13A. In the present exemplary embodiment, since the locations of text blocks express the structure of a document image or a text block is highly likely to be used for file name assignment, only text blocks are extracted from among all of the blocks. Furthermore, while, in the present exemplary embodiment, blocks to be extracted are narrowed down to text blocks, this does not impose a limitation on using information about another BS processing result of, for example, a photo region or a table region to calculate the degree of similarity. Moreover, in step S802, the CPU 105 removes a noise block. The noise block is a short character string which is considered to make no sense as a character string. Since these text blocks are likely to be blocks in which noises included in the query document image are recognized as text blocks, the CPU 105 deletes the above-mentioned text blocks. Then, the CPU 105 sorts the text blocks remaining after removal of noises in the vertical direction from above to below. Sorting of text blocks is performed to calculate the degree of similarity in a later stage.

In step S803, the CPU 105 determines whether there is an unprocessed registered document image, the degree of similarity of which to the query document image is not yet calculated, in the storage unit 107. If it is determined that there is an unprocessed registered document image, in which the similarity calculation processing is not yet performed, among the registered document images retained in the storage unit 107 (YES in step S803), the CPU 105 loads the unprocessed registered document image onto the RAM 106 and advances the processing to step S804. Information to be loaded onto the RAM 106 in step S803 is not each registered document image itself but information about text blocks in each registered document image and information indicating a text block used for file name assignment of a registered document image. Furthermore, while, in the present exemplary embodiment, the CPU 105 reads out registered document images one by one to calculate the degree of similarity, the CPU 105 can load information about all of the registered document images onto the RAM 106 prior to step S801. If, in step S803, it is determined that there is no registered document image the degree of similarity of which to the query document image is not yet calculated (NO in step S803), the CPU 105 advances the processing to step S806 described below.

Next, in step S804, the CPU 105 calculates the shift amount between the query document image and the registered document image read out in step S803. The shift amount is a value indicating a positional relationship in which, when the query document image and the registered document image are superimposed on each other, the rate at which text blocks of the two document images overlap becomes largest. Details of this processing are described below.

Next, in step S805, the CPU 105 calculates the degree of similarity of the registered document image read out in step S803 to the query document image. Details of this processing are described below. After completing the processing in step S805, the CPU 105 returns the processing to step S803.

When the processing for calculating the degree of similarity to the query document image is ended with respect to all of the registered document images, then in step S806, the CPU 105 selects a registered document image the degree of similarity of which to the query document image becomes largest, from among the registered document images. Thus far is the detailed flow of step S204 illustrated in FIG. 2.

Figure 10A:
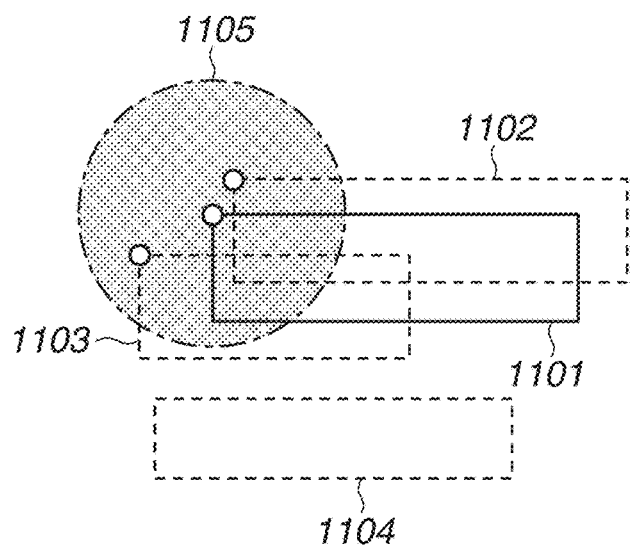
FIGS. 10A and 10B are schematic diagrams illustrating the correspondence in text block between the query document image and a registered document image in the exemplary embodiment.
Figure 10B:
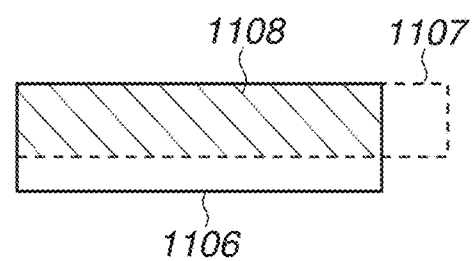

Next, details of the shift amount calculation processing which the CPU 105 performs in step S804 illustrated in FIG. 8 are described with reference to FIG. 9 and FIGS. 10A and 10B. Furthermore, the shift amount calculation method described with reference to FIG. 9 and FIGS. 10A and 10B is an example and, thus, can be replaced by another usable method.

First, in step S1001, the CPU 105 acquires text block information about the query document image from the RAM 106. The text block information is information indicating, for example, the coordinates of the upper left corner point of a text block and the size of the block, and is, for example, information illustrated in FIG. 13B. Next, in step S1002, the CPU 105 acquires text block information about the registered document image acquired from the storage unit 107 in step S803 from the RAM 106. The information to be acquired in step S1002 is, for example, information illustrated in FIG. 13A.

Then, in step S1003, the CPU 105 selects text blocks corresponding to the respective text blocks included in the query document image from among the text blocks included in the registered document image. The method for selecting the corresponding text blocks is described with reference to FIGS. 10A and 10B. FIGS. 10A and 10B are schematic diagrams illustrating a part which is cut out from an image obtained by superimposing the query document image and the registered document image on each other. A block 1101 drawn with a solid line in FIG. 10A is a text block included in the query document image. Blocks 1102, 1103, and 1104 drawn with a dashed line in FIG. 10A are text blocks included in the registered document image. A circle 1105 drawn with a dashed-dotted line in FIG. 10A is a circle with a predetermined radius centering on the upper left vertex of the text block 1101. Thus, the coordinates of the upper left corner points of the text blocks 1102 and 1103 are located at distances shorter than a predetermined distance from the upper left corner point of the text block 1101, and the coordinates of the upper left corner point of the text block 1104 is located at a distance longer than the predetermined distance from the upper left corner point of the text block 1101.

First, the CPU 105 selects one text block from the query document image, and then selects a text block in the registered document image the upper left corner point of which is located inside a circle with a predetermined radius centering on the upper left corner point of the selected text block in the query document image. In FIG. 10A, the text blocks 1102 and 1103 are located at distances shorter than a predetermined distance from the text block 1101. Next, the CPU 105 calculates an overlap rate to the text block 1101 in the query document image with respect to each of the text blocks 1102 and 1103 in the registered document image. The overlap rate is a value indicating to what extent a text block in the query document image and a text block in the registered document image overlap each other.

The method for calculating the overlap rate is described with reference to FIG. 10B. First, the CPU 105 causes the positions of upper left corner points of a text block 1106 in the query document image and a text block 1107 in the registered document image to coincide with each other. Next, the CPU 105 calculates the area of a common portion 1108 shared by the text block 1106 in the query document image and the text block 1107 in the registered document image. Then, the CPU 105 calculates, as the overlap rate, the proportion of the area of the common portion 1108 to the larger one in area of the text block 1101 in the query document image and the text block 1102 or 1103 in the registered document image. The CPU 105 calculates the overlap rates with respect to all of the text blocks in the registered document image corresponding to the respective text blocks in the query document image. For example, referring to FIG. 10A, the CPU 105 calculates the overlap rate between the text block 1101 and the text block 1102 and the overlap rate between the text block 1101 and the text block 1103.

Next, the CPU 105 acquires the maximum overlap rate with respect to each of the text blocks included in the query document image. For example, referring to FIG. 10A, the CPU 105 selects the maximum overlap rate from the overlap rate between the text block 1101 and the text block 1102 and the overlap rate between the text block 1101 and the text block 1103. Then, the CPU 105 calculates a value obtained by multiplying the maximum overlap rate by a predetermined coefficient α less than 1. The predetermined coefficient α is a coefficient used to determine a threshold value for selecting a text block in the registered document image corresponding to a text block in the query document image. The CPU 105 selects a text block in the registered document image having the overlap rate larger than the calculated value, as a text block corresponding to a text block in the query document image. Hereinafter, the correspondence between the text block in the query document image and the text block in the registered document image obtained in the above-described processing is referred to as a "corresponding point pair". For example, referring to FIG. 10A, suppose that both the overlap rate between the text block 1101 and the text block 1102 and the overlap rate between the text block 1101 and the text block 1103 exceed the threshold value. At this time, two corresponding point pairs appear as a pair of the text block 1101 and the text block 1102 and a pair of the text block 1101 and the text block 1103.

In the present exemplary embodiment, a value obtained by multiplying the maximum overlap rate with respect to a text block included in the query document image by the coefficient α is used as a threshold value. However, a previously determined overlap rate can be used as a threshold value and, then, the CPU 105 can be configured to select text blocks the overlap rate between which is higher than the threshold value as text blocks serving as a corresponding point pair.

Next, in step S1004, the CPU 105 determines whether there is an unprocessed corresponding point pair, which is not yet subjected to processing in steps S1005 and S1006, among the corresponding point pairs calculated in step S1003. If it is determined that there is an unprocessed corresponding point pair (YES in step S1004), the CPU 105 advances the processing to step S1005, and, if it is determined that there is no unprocessed corresponding point pair (NO in step S1004), the CPU 105 advances the processing to step S1007. The CPU 105 performs processing in step S1005 and S1006 to calculate a distribution indicating to what extent positions of a text block in the query document image and a text block in the registered document image when being superimposed on each other deviate from each other.

In step S1005, the CPU 105 selects one corresponding point pair from among the corresponding point pairs calculated in step S1003 and calculates a correlation value thereof. First, the CPU 105 weights the correlation value according to the number of text blocks in the registered document image associated with a text block in the query document image included in the selected corresponding point pair. Moreover, the CPU 105 weights the correlation value according to the number of text blocks in the query document image associated with a text block in the registered document image included in the selected corresponding point pair. Weighting coefficients for the correlation value which are based on the number of corresponding text blocks are defined by, for example, a table such as that illustrated in FIG. 11A. Such a table is previously stored in the storage unit 107. The horizontal axis of the table indicates how many text blocks in the registered document image a text block in the query document image during processing is associated with. Moreover, the vertical axis of the table indicates how many text blocks in the query document image a text block in the registered document image during processing is associated with. Referring to FIG. 11A, weighting to the correlation value is set in such a way as to become higher as the correspondence between text blocks in the query document image and text blocks in the registered document image comes closer to one for one.

While, in the present exemplary embodiment, weighting is performed with use of a table, weighting to the correlation value can be performed based on a calculating formula. For example, suppose that the number of text blocks in the registered document image associated with a text block in the query document image is N and the number of text blocks in the query document image associated with a text block in the registered document image is M. In this case, for example, the CPU 105 can use a value obtained by calculating $(1/N+1/M)/2$, as a weighting to the correlation value.

Moreover, in step S1005, the CPU 105 can weigh the correlation value according to the Y coordinate of a text block in the query document image targeted for processing. As mentioned above, in a case where the same format is used, a query document image and a registered document image are likely to be similar in the structure of an upper portion thereof. Therefore, the image processing apparatus 100 increases a weighting with respect to a text block located in an upper portion of the query document image and decreases a weighting with respect to a text block in a lower portion thereof. FIG. 11B illustrates an example of the weighting associated with the position of a text block. The horizontal axis in FIG. 11B indicates the Y coordinate position obtained when the image height is normalized to 1. In FIG. 11B, the smaller value of the Y coordinate after being normalized indicates an upper portion of the query document image, and the value of the Y coordinate closer to 1 indicates a lower portion of the query document image. The vertical axis indicates the weighting associated with the Y coordinate. Referring to FIG. 11B, the weighting becomes largest with respect to an uppermost portion of the image, the weighting progressively decreases until the middle of the image, and the weighting becomes zero with respect to the lower half of the image.

Furthermore, weighting can be performed with use of both of the above-mentioned methods or can be performed with use of only one of the above-mentioned methods. In the case of weighting the correlation value with use of a plurality of methods, the image processing apparatus 100 multiplies or adds a plurality of weightings together for use.

Next, in step S1006, the CPU 105 generates a histogram by voting the correlation values of the shift amount in each of the X direction and the Y direction. Specifically, in step S1006, the CPU 105 calculates the difference amount (shift amount) in the X direction and the difference amount (shift amount) in the Y direction of the upper left vertices of text blocks serving as a corresponding point pair. Then, the CPU 105 votes the correlation value calculated with use of the weighting obtained in step S1005 to a bin corresponding to the calculated shift amount. The width of a bin in the histogram can be a previously determined optional width.

The CPU 105 performs steps S1005 and S1006 with respect to all of the corresponding point pairs, so that a histogram of the shift amount in each of the X direction and the Y direction is generated. With the above-described processing performed, for example, a histogram such as that illustrated in FIG. 11C is generated. To reduce the influence of noise, smoothing can be applied to the generated histogram.

After the processing in steps S1005 and S1006 is completed with respect to all of the corresponding point pairs and the histograms are generated, the CPU 105 performs processing in step S1007. In step S1007, the CPU 105 analyzes the histogram in each of the X direction and the Y direction and calculates a shift amount candidate between the query document image and the registered document image in each of the X direction and the Y direction.

The method for calculating the shift amount candidate is described with reference to FIG. 11C. FIG. 11C illustrates an example of a histogram of the shift amount generated in step S1007. The horizontal axis of the graph indicates the shift amount, and the vertical axis thereof indicates the correlation value (the frequency of the histogram). The CPU 105 selects the shift amount in which the correlation value of the histogram is greater than a predetermined threshold value, as a candidate for the shift amount. The predetermined threshold value can be a fixed threshold value or can be, for example, a value obtained by multiplying the highest correlation value in the histogram by a predetermined coefficient less than or equal to 1. Referring to FIG. 11C, the peak of the histogram appears at one point, so that there is only one shift amount serving as a candidate. There can be a plurality of shift amounts serving as candidates. The CPU 105 applies such processing to each of the X direction and the Y direction, thus calculating the shift amount candidates in the X direction and the Y direction.

Finally, in step S1008, the CPU 105 combines the shift amount candidates in the X direction and the Y direction to make pairs of shift amount candidates. For example, suppose that the shift amount candidates in the X direction include two types, xShift1 and xShift2, and the shift amount candidates in the Y direction include three types, yShift1, yShift2, and yShift3. In this case, 2×3=6 types of shift amount candidates are selected as the shift amount candidates. Furthermore, the CPU 105 can obtain the shift amount candidates by a method other than the above-mentioned method.

With the above-described flow performed, the shift amount candidates between the query document image and the registered document image are calculated.

Figure 12:
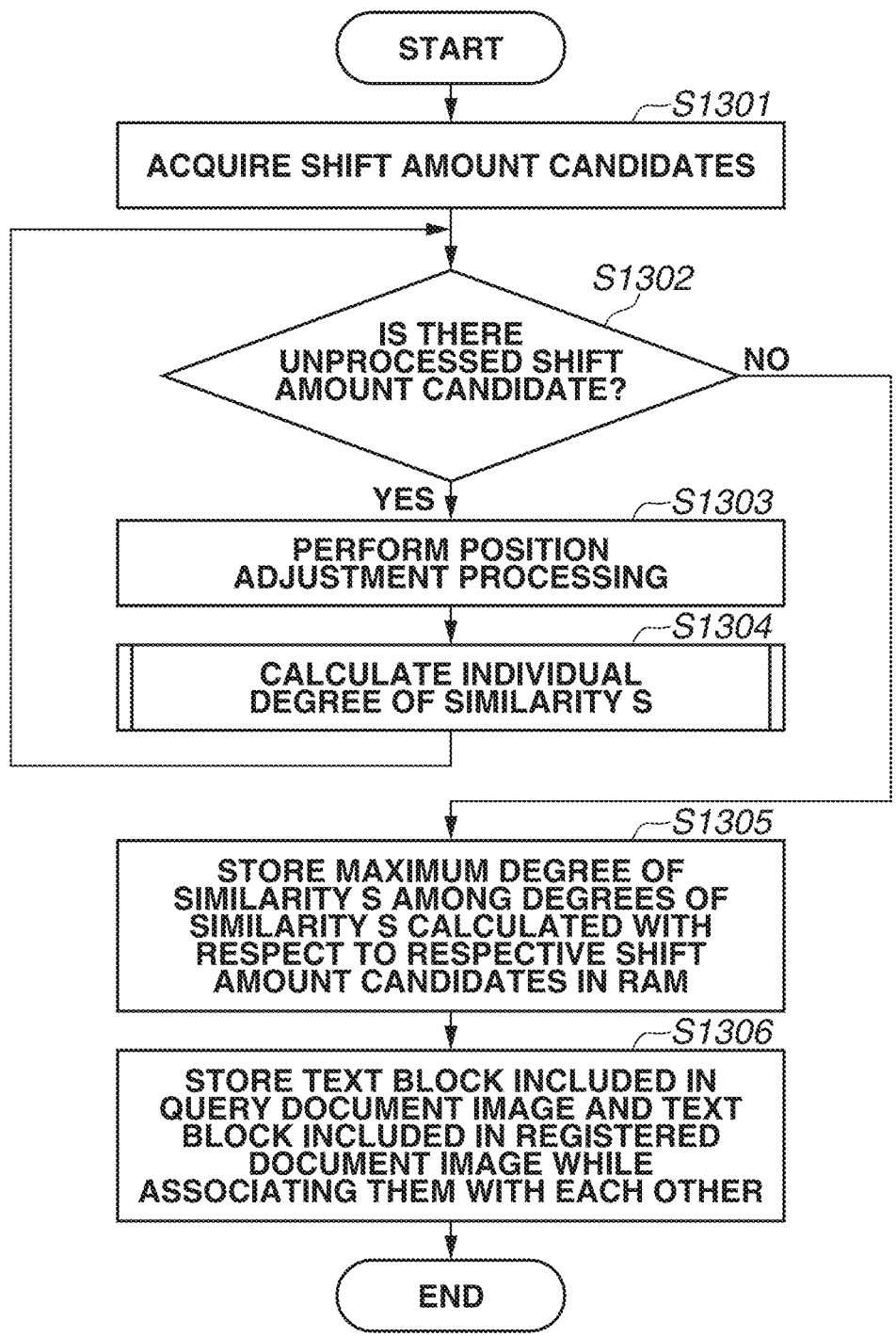
FIG. 12 is a flowchart illustrating processing for selecting a registered document image which matches the query document image in the exemplary embodiment.

Next, the similarity calculation processing which the CPU 105 performs in step S805 illustrated in FIG. 8 is described with reference to FIG. 12. As with FIG. 2, processing illustrated in the flowchart of FIG. 12 is performed by the CPU 105 loading program code stored in the storage unit 107 onto the RAM 106 and controlling the apparatus control unit 102 according to the program code.

First, in step S1301, the CPU 105 acquires the shift amount candidates calculated in step S1008 from the RAM 106.

Next, in step S1302, the CPU 105 determines whether there is an unprocessed shift amount candidate, in which the degree of similarity is not yet calculated, among the shift amount candidates read out from the RAM 106 in step S1301. If it is determined that the image processing apparatus 100 has performed calculation of the degree of similarity with respect to all of the shift amount candidates (NO in step S1302), the CPU 105 advances the processing to step S1305. If it is determined that there is a shift amount candidate in which the degree of similarity is not yet calculated (YES in step S1302), the CPU 105 advances the processing to step S1303.

In step S1303, the CPU 105 selects a set of shift amount candidates from the shift amount candidates in which the degree of similarity is not yet calculated and performs position adjustment between the query document image and the registered document image in conformity with the selected set of shift amount candidates. Specifically, the CPU 105 uniformly performs parallel translation processing on the coordinate positions of text blocks included in the query document image based on the shift amount candidates.

Next, in step S1304, the CPU 105 calculates the degree of similarity S by comparing the query document image and the registered document image subjected to position adjustment with each other. The method for calculating the degree of similarity S, which the CPU 105 performs in step S1304, is described below with reference to FIG. 14.

After calculating the degrees of similarity S with respect to all of the shift amount candidates, in step S1305, the CPU 105 selects a set of shift amount candidates having the highest degree of similarity from among the sets of shift amount candidates in which the degrees of similarity have been calculated, and stores the degree of similarity obtained in a case where the selected shift amount candidates are used in the RAM 106. Then, in step S1306, the CPU 105 generates information indicating the correspondence of text blocks in a case where the query document image and the registered document image are superimposed on each other with the shift amount candidates selected in step S1305, and stores the generated information in the RAM 106. The information indicating the correspondence between text blocks included in the query document image and text blocks included in the registered document image to be generated in step S1306 is information indicated by, for example, a table illustrated in FIG. 13C. The table illustrated in FIG. 13C stores the identifier (ID) of a text block included in the query document image and the ID of a text block included in the registered document image while associating them with each other. Here, a text block which is associated with a text block included in the query document image is a block associated by processing described below in step S1404 illustrated in FIG. 14.

In the above-described flow, the image processing apparatus 100 performs position adjustment between the query document image and the registered document image, thus calculating the degree of similarity. Next, details of the processing for calculating the degree of similarity S in step S1304 are described with reference to FIG. 14. As with FIG. 2, processing illustrated in the flowchart of FIG. 14 is performed by the CPU 105 loading program code stored in the storage unit 107 onto the RAM 106 and controlling the apparatus control unit 102 according to the program code.

First, in step S1401, the CPU 105 performs initialization processing to calculate the degree of similarity between the query document image and the registered document image. In the initialization processing, the CPU 105 sets the degree of similarity S to 0, and acquires, from the RAM 106, information about text blocks included in the query document image and text blocks included in the registered document image subjected to position adjustment in step S1303 illustrated in FIG. 12. The information to be obtained in step S1401 is information stored in the tables illustrated in FIGS. 13A, 13B, and 13C.

Next, in step S1402, the CPU 105 determines whether there is an unprocessed text block, in which the processing in steps S1403 to S1406 is not yet performed, in the query document image. If it is determined that there is an unprocessed text block (YES in step S1402), the CPU 105 advances the processing to step S1403. If it is determined that the processing of all of the text blocks included in the query document image is completed (NO in step S1402), the CPU 105 advances the processing to step S1407.

In a case where there is a text block in which the processing is not yet completed, then in step S1403, the CPU 105 selects one text block, which is to be processed, from among the unprocessed text blocks. In the present exemplary embodiment, the CPU 105 processes unprocessed text blocks included in the query document image in order from above.

Figure 15A:
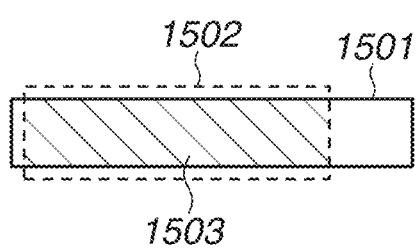
FIGS. 15A and 15B are schematic diagrams used to explain an overlap rate calculation method in the exemplary embodiment.
Figure 15B:
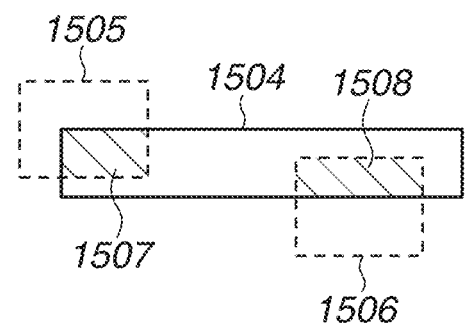

Next, in step S1404, the CPU 105 selects a text block in the registered document image associated with the text block selected in step S1403. The text block in the registered document image associated with the text block selected in step S1403 is a text block overlapping in image data obtained by position adjustment performed in step S1303. There can be a plurality of text blocks in the registered document image associated with one text block in the query document image. For example, in a case where, as illustrated in FIG. 15A, a text block 1502 in the registered document image overlaps a text block 1501 in the query document image, the text block 1501 and the text block 1502 are associated with each other. Suppose that, as illustrated in FIG. 15B, text blocks 1505 and 1506 in the registered document image overlap a text block 1504 in the query document image. At this time, the text block 1505 and the text block 1506 are associated with the text block 1504.

Next, in step S1405, the CPU 105 calculates an overlap rate by calculating the area of a region at which the text block in the query document image selected in step S1403 overlaps the corresponding text block in the registered document image (the common area). The overlap rate to be calculated by the CPU 105 in step S1405 is the proportion of the common area to the larger text block of the text block in the query document image and the text block in the registered document image. The method for calculating the overlap rate in step S1405 is similar to that in step S1003. However, in step S1405, since the position adjustment between the query document image and the registered document image is already completed, the CPU 105 does not perform processing for causing the upper left vertices of text blocks to coincide with each other in step S1003.

Examples of the calculation are described with reference to FIGS. 15A and 15B. In FIG. 15A, the text block 1501 in the query document image and the text block 1502 in the registered document image overlap each other, and the common area is the area of a region 1503. Therefore, the overlap rate in the case of FIG. 15A is the proportion of the area 1503 to the larger one in area of the text block 1501 and the text block 1502.

In FIG. 15B, the text block 1504 overlaps the text blocks 1505 and 1506, and the common area is the sum of the areas of a region 1507 and a region 1508. Accordingly, the overlap rate in the case of FIG. 15B is the proportion of the area of the sum of the region 1507 and the region 1508 to the largest block in area of the text blocks 1504, 1505, and 1506.

Then, in step S1406, the CPU 105 determines whether a condition for starting the similarity calculation is satisfied. If it is determined that the condition is not satisfied (NO in step S1406), the CPU 105 returns the processing to step S1402. If it is determined that the condition for starting the similarity calculation is satisfied (YES in step S1406), the CPU 105 advances the processing to step S1407. The condition for starting the similarity calculation includes, for example, the following conditions 1 to 3. The condition 1 is whether the number of text blocks in the query document image in which the overlap rate has been calculated has reached a predetermined number. The condition 2 is whether the overlap rate has been calculated up to a text block located at a predetermined distance from the upper side of the query document image. The condition 3 is whether the overlap rate has been calculated up to a text block located at a predetermined distance from the uppermost text block. The condition for starting the similarity calculation can be any one of the above three conditions or two or more thereof.

In a case where the number of text blocks in which the overlap rate has been calculated is small, even if the degree of similarity is calculated, the degree of similarity may not be sufficiently reliable. Therefore, the CPU 105 calculates the degree of similarity only in a case where the text blocks in which the overlap rate has been calculated satisfy such a condition as mentioned above. Naturally, the CPU 105 can be configured to calculate the degree of similarity only after the overlap rate has been calculated with respect to all of the text blocks included in the query document image. Moreover, even in a case where the above-mentioned condition is not satisfied, when the calculation of the overlap rate has been completed with respect to all of the text blocks in the query document image, the image processing apparatus 100 calculates the degree of similarity.

In step S1407, the CPU 105 calculates the degree of similarity S. The degree of similarity S can be calculated by various known methods, but, in the present exemplary embodiment, is calculated by the following formula:

Degree of similarity $S$=Overlap/TotalArea

Overlap=the sum of common areas used for calculating the overlap rate

TotalArea=the larger one of QueryArea and RegistArea

QueryArea=the total area of text blocks in the query document image used for calculating the overlap rate RegistArea=the total area of text blocks in the registered document image used for calculating the overlap rate In the examples illustrated in FIGS. 15A and 15B, suppose that the text blocks 1501 and 1504 are text blocks included in the same query document image and the calculation of the overlap rate has been completed with respect to the two text blocks. At this time, Overlap is the sum of the areas of the region 1503, the region 1507, and the region 1508. QueryArea is the sum of the areas of the text block 1501 and the text block 1504. Then, RegistArea is the sum of the areas of the text block 1502 in the registered document image, the text block 1505 in the registered document image, and the text block 1506 in the registered document image. Since QueryArea>RegistArea, TotalArea becomes equal to QueryArea.

With the above-described flow, the CPU 105 calculates the degree of similarity S. Furthermore, while, in the present exemplary embodiment, the BS text blocks are used for the similarity calculation, another similarity calculation method can also be used.

Thus far is the processing for performing the scan assist processing in the image processing apparatus 100. In the present exemplary embodiment, the image processing apparatus 100 extracts text blocks from image data acquired by scanning a document. Then, the image processing apparatus 100 selects a text block used for scan assist processing from among the extracted text blocks. The image processing apparatus 100 performs character recognition processing on the selected text block and thus displays a character recognition result on a display unit. As mentioned above, the image processing apparatus 100 according to the present exemplary embodiment performs character recognition processing not on the entire image data but on only the selected portion thereof, and displays a result of the character recognition processing on the display unit. In doing so, the image processing apparatus 100 is not required to perform character recognition processing on a region unnecessary for displaying. As a result, the image processing apparatus 100 is able to show to the user a result of character recognition processing of a portion for a scan assist system in a shorter period of time than when performing character recognition processing on the entire document image and then displaying a result of the character recognition processing on the display unit.

In the first exemplary embodiment, displaying of a file name is performed in response to the completion of OCR processing of a text block for displaying of the file name in the query document image, so that a period of time required until the file name is displayed is shortened.

In a case where a document with a given format is read, documents with the same format are sometimes continuously read. At this time, a text block used for a file name of the image generated by reading each document is the same region as a region used for file name assignment in the just previous image data. Therefore, in a second exemplary embodiment of the disclosure, a region in which to extract a text block from an image obtained by scanning is limited to a partial image including a region which was used for file name assignment of an image obtained by the just previous scanning, so that a period of time required until displaying of a file name is shortened.

Hereinafter, the second exemplary embodiment is described with a focus on a portion different from that of the above-described first exemplary embodiment. Since the portion different from that of the first exemplary embodiment is the flowchart of FIG. 2, the second exemplary embodiment is described with reference to the flowchart of FIG. 16 instead of the flowchart of FIG. 2.

Figure 16:
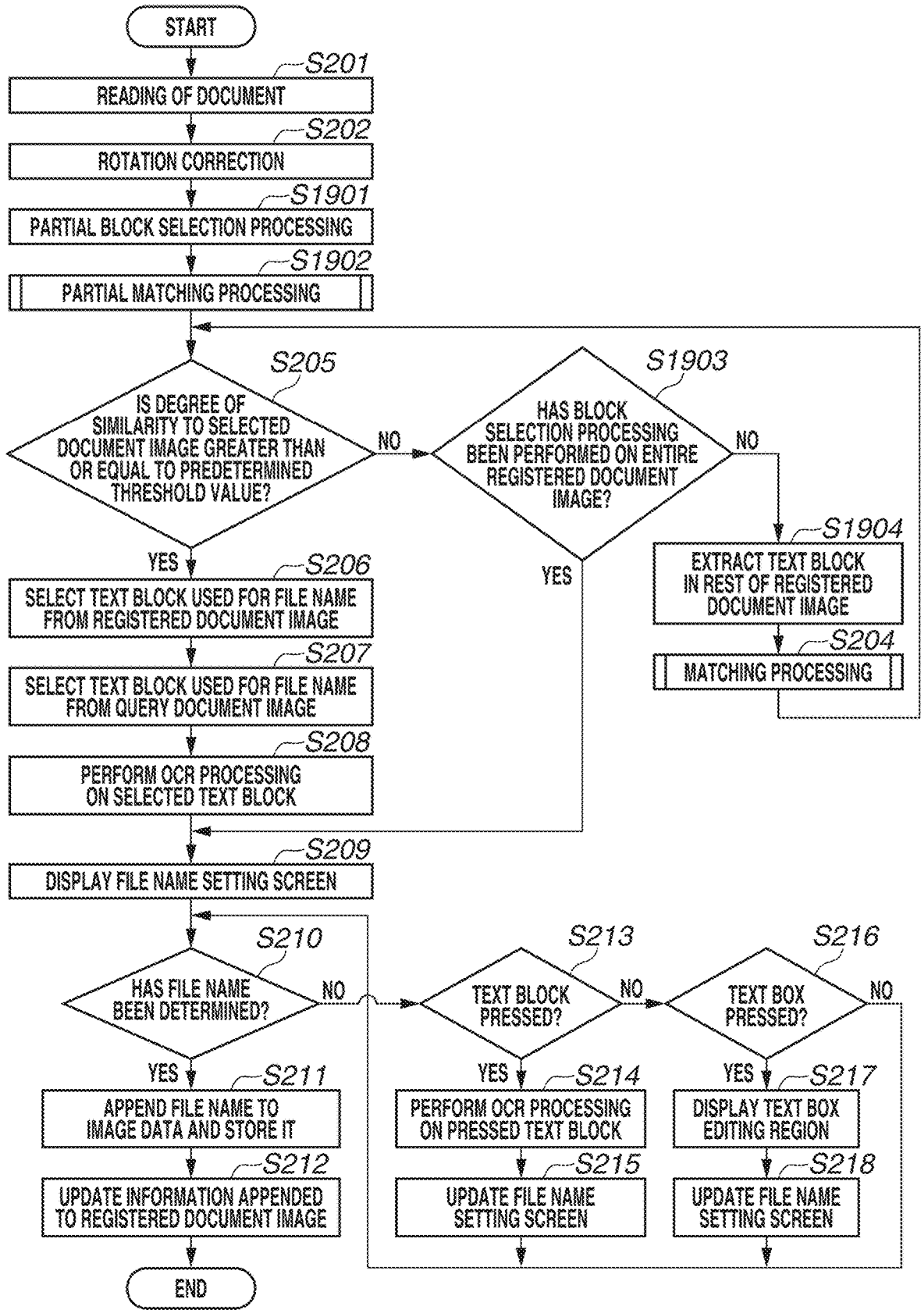
FIG. 16 is a flowchart illustrating processing which an image processing apparatus performs according to a second exemplary embodiment.

FIG. 16 is a flowchart illustrating the entire processing which is performed on a newly scanned document image in the image processing apparatus 100. The flow illustrated in FIG. 16 is activated in response to the user interface 104 receiving an instruction for scanning a document image from the user. The processing illustrated in the flowchart of FIG. 2 is performed by the CPU 105 loading program code stored in the storage unit 107 onto the RAM 106 and controlling the apparatus control unit 102 according to the program code.

Steps S201 and S202 in FIG. 16 are the same as those in FIG. 2, and are, therefore, omitted from description.

Next, in step S1901, the CPU 105 performs partial block selection processing on the query document image. While the block selection processing is the same as step S203 in FIG. 2, in the second exemplary embodiment, the CPU 105 performs block selection processing not on the entire query document image but on a partial image included in the query document image.

The method for setting a region in which to perform block selection processing is described with reference to FIGS. 17A, 17B, 17C, and 17D. First, suppose that a query document image such as that illustrated in FIG. 17A was scanned and text blocks 2001, 2002, and 2003 were used for file name assignment. At this time, the image processing apparatus 100 stores the query document image and information about the text blocks which were used for a file name in the RAM 106.

Next, suppose that the query document image generated by reading a document is an image illustrated in FIG. 17B. At this time, a partial image serving as a region 2004 in which text blocks corresponding to the text blocks used for file name assignment among the text blocks included in the query document image illustrated in FIG. 17A are included is selected as a target for block selection processing.

Moreover, as another example, suppose that, first, the query document image generated by reading a document is an image illustrated in FIG. 17C. Suppose that text blocks 2001, 2002, and 2005 included in the query document image illustrated in FIG. 17C were used for file name assignment. At this time, if a region which includes all of the above-mentioned three text blocks is set as a region targeted for block selection, the entirety of the query document image would be regarded as a target region. Therefore, in a case where the query document image is such an image as illustrated in FIG. 17C, the CPU 105 selects a plurality of regions targeted for block selection. For example, suppose that the query document image of a document scanned next to the query document image illustrated in FIG. 17C is an image illustrated in FIG. 17D. At this time, the image processing apparatus 100 sets a region 2006 and a region 2007 as targets for block selection. Whether to set a target for block selection to a single region or to a plurality of divided regions is assumed to be set based on, for example, positions of text blocks used for file name assignment. For example, in a case where the distance between text blocks used for file name assignment is longer than a predetermined distance, the image processing apparatus 100 sets a target for block selection to a plurality of divided regions.

Each of the region 2004, the region 2006, and the region 2007 is a region obtained by adding a previously determined margin to a rectangular region including a text block used for file name assignment, in such a way as to be able to deal with any positional deviation occurring during scanning. Moreover, the image processing apparatus 100 sets a region in such a manner that a minimum number of BS text blocks are included in the region.

Limiting the block selection region in the above-described way enables shortening a period of time required for block selection processing.

Next, in step S1902, the CPU 105 performs matching processing between the query document image on which the partial block selection processing has been performed and the document image which has been scanned at the previous time and to which a file name has been assigned, thus calculating the degree of similarity.

The matching processing performed in step S1902 is the same as the matching processing performed in step S204 illustrated in FIG. 2. However, in step S1902, the CPU 105 performs matching processing with respect to only the document image obtained at the previous time. Arranging not to perform matching processing with respect to a plurality of document images enables shortening a period of time required until a document used for matching is selected.

In step S205, the CPU 105 determines whether the degree of similarity to the document image selected in step S1902 or step S204 described below is greater than or equal to a predetermined threshold value.

If it is determined that the degree of similarity of the query document image to the selected document image is greater than or equal to the predetermined threshold value (YES in step S205), the CPU 105 performs processing in step S206 and subsequent steps. The processing in step S206 and subsequent steps is similar to that in the first exemplary embodiment, and is, therefore, omitted from description.

If it is determined that the degree of similarity of the query document image to the selected document image is less than the predetermined threshold value (NO in step S205), then in step S1903, the CPU 105 determines whether there is a region in which block selection is not yet performed in the query document image. If it is determined that there is a region in which the block selection processing is not yet completed (NO in step S1903), the CPU 105 advances the processing to step S1904. If it is determined that there is no region in which the block selection processing is not yet completed (YES in step S1903), since the block selection processing has been completed with respect to the entire query document image, the CPU 105 advances the processing to step S209. Processing in step S209 and subsequent steps is similar to that in the first exemplary embodiment, and is, therefore, omitted from description.

In step S1904, the CPU 105 performs block selection processing on a region in which block selection processing is not yet performed. Performing step S1904 leads to the block selection processing having been performed on the entire query document image. After that, the CPU 105 advances the processing to step S204. Processing in step S204 is similar to that in the first exemplary embodiment, and is, therefore, omitted from description.

Furthermore, in the second exemplary embodiment, first, the CPU 105 performs partial block selection processing, and, in a case where the query document image is different from the just previous document image, the CPU 105 performs block selection processing with respect to a remaining region. The CPU 105 can determine whether to perform partial block selection processing, based on a given conditional expression.

For example, a period of time required until block selection processing is performed on the entire document image and a similar registered document image is selected is previously defined as A. A period of time required for processing for performing block selection on a part of the document image and determining whether the document image is similar to the just previous document image is defined as B. Then, the probability that the document which has been scanned is the same in format as the document which has been scanned at the previous time is expressed by a variable P. The initial value of the variable P is assumed to be a previously determined value. Each time a document with the same format is continuously read, the CPU 105 increases the value of the variable P. Then, after completing the processing in step S202 in FIG. 16, the CPU 105 determines whether "$A>(A+B)\cdot(1-P)+B\cdot P$" holds. If the above-mentioned relationship holds, the CPU 105 performs block selection processing on a part of the query document image, and, if the above-mentioned relationship does not hold, the CPU 105 performs block selection processing on the entire query document image. In doing so, in a case where documents with the same format are continuously read, since the value of the variable P is increased, the CPU 105 performs partial block selection processing. On the other hand, in a case where documents with the respective different formats are read during scanning, since the value of the variable P is decreased, the CPU 105 does not perform partial block selection processing but performs block selection processing on the entire document image.

Moreover, in steps S206 to S207, the CPU 105 selects text blocks used for file name assignment from the document subjected to matching. Then, the CPU 105 performs OCR processing on text blocks in the query document image corresponding to the selected text blocks. In a case where documents with the same format are read, character strings included in the corresponding text blocks may become the same. Then, in a case where the probability that results of OCR processing of the corresponding text blocks coincide with each other is greater than or equal to a predetermined threshold value, the CPU 105 converts the character string obtained by OCR processing into text and stores the character string converted into text while associating the character string converted into text with a text block. Then, in a case where, next, a document with the same format has been scanned, the CPU 105 does not perform OCR processing on a text block associated with the character string converted into text but displays the character string converted into text. This way enables shortening a period of time required for OCR processing of the selected text block.

As described above, according to a series of flow in the second exemplary embodiment, the image processing apparatus 100 performs text block processing on only a part of the query document image and calculates the degree of similarity to the just previous query document image. In doing so, in a case where documents with the same format are continuously scanned, the image processing apparatus 100 is able to shorten a period of time required until a file name of image data generated by scanning is displayed on a display unit.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus comprising:
   a memory that stores a program; and
   a processor that executes the program to:
   identify a plurality of regions in an acquired image, wherein the identified regions include at least a text region;
   determine information about a registered document most similar to the acquired image from among information about a plurality of registered documents stored in a storage unit;
   select a plurality of target text regions in the acquired image based on a positions of the plurality of target text regions previously specified with respect to the determined information about the most similar registered document;
   perform first character recognition processing on the selected plurality of target text regions;
   output a plurality of pieces of text data obtained by the first character recognition processing, wherein the outputted plurality of pieces of text data is joined with a predetermined delimiter character in a sequential order previously set with respect to the plurality of target text regions;
   receive specification of a text region by a user among text regions including the selected plurality of target text regions on which the first character recognition processing has been performed; and
   perform, after the specification of the text region by the user is received, second character recognition processing on at least one region that includes the text region specified by the user, which is different from the selected target text region,
   wherein text data of the specified text region obtained by the second character recognition processing is used to update the outputted plurality of pieces of text data, and
   the second character recognition processing is not performed in a case where the selected plurality of target text regions on which the first character recognition processing has been performed is specified by the user.

2. The apparatus according to claim 1, wherein the output plurality of pieces of text data is recommended as a file name of the acquired image.

3. The apparatus according to claim 1,
   wherein the specified text region is specified by the user from among the identified plurality of regions, and
   wherein the second character recognition processing is performed on the specified text region if character recognition processing has not been performed on the specified text region yet.

4. The apparatus according to claim 1, wherein the text data of the specified text region obtained by performing the second character recognition processing is joined behind the outputted plurality of pieces of text data.

5. The apparatus according to claim 1, wherein a predetermined delimiter character and the text data obtained by performing the second character recognition processing performed on the specified region are joined and displayed behind the plurality of pieces of text data obtained by the first character recognition processing performed on the selected plurality of target text regions.

6. The apparatus according to claim 1, wherein the plurality of pieces of text data and/or the text data can be edited based on an instruction from the user.

7. The apparatus according to claim 1, wherein the identifying of the plurality of regions on the acquired image is performed with respect to a previously determined partial image in the acquired image.

8. A method comprising:
   identifying a plurality of regions in an acquired image, wherein the identified regions include at least a text region;
   determining information about a registered document most similar to the acquired image from among information about a plurality of registered documents stored in a storage unit;
   selecting a plurality of target text regions in the acquired image based on a positions of the plurality of target text regions previously specified with respect to the determined information about the most similar registered document;
   performing first character recognition processing on the selected plurality of target text regions;
   outputting a plurality of pieces of text data obtained by the first character recognition processing, wherein the outputted plurality of pieces of text data is joined with a predetermined delimiter character in a sequential order previously set with respect to the plurality of target text regions;
   receiving specification of a text region by a user among text regions including the selected plurality of target text regions on which the first character recognition processing has been performed; and
   performing, after the specification of the text region by the user is received, second character recognition processing on at least one region that includes the text region specified by the user, which is different from the selected target text region,
   wherein text data of the specified text region obtained by the second character recognition processing is used to update the outputted plurality of pieces of text data, and
   the second character recognition processing is not performed in a case where the selected plurality of target text regions on which the first character recognition processing has been performed is specified by the user.

9. A non-transitory computer-readable storage medium storing a program that, when executed by a computer, causes the computer to:
   identify a plurality of regions in an acquired image, wherein the identified regions include at least a text region;
   determine information about a registered document most similar to the acquired image from among information about a plurality of registered documents stored in a storage unit;
   select a plurality of target text regions in the acquired image based on a positions of the plurality of target text regions previously specified with respect to the determined information about the most similar registered document;
   perform first character recognition processing on the selected plurality of target text regions;
   output a plurality of pieces of text data obtained by the first character recognition processing, wherein the outputted plurality of pieces of text data is joined with a predetermined delimiter character in a sequential order previously set with respect to the plurality of target text regions;
   receive specification of a text region by a user among text regions including the selected plurality of target text regions on which the first character recognition processing has been performed; and perform, after the specification of the text region by the user is received, second character recognition processing on at least one region that includes the text region specified by the user, which is different from the selected target text region, wherein text data of the specified text region obtained by the second character recognition processing is used to update the outputted plurality of pieces of text data, and the second character recognition processing is not performed in a case where the selected plurality of target text regions on which the first character recognition processing has been performed is specified by the user.

10. The non-transitory computer-readable storage medium according to claim 6, wherein the output plurality of pieces of text data is recommended as a file name of the acquired image.

11. The non-transitory computer-readable storage medium according to claim 9, wherein the specified text region is specified by the user from among the identified plurality of regions.

12. The non-transitory computer-readable storage medium according to claim 9, wherein the second character recognition processing is performed on the specified text region if character recognition processing has not been performed on the specified text region yet.

13. The apparatus according to claim 1, wherein the plurality of pieces of text data is output by displaying a screen including the plurality of pieces of data on a display, the screen further includes the acquired image, and different characters, each being for a different one of the selected plurality of target text regions, are added within the acquired image included in the screen.

14. The apparatus according to claim 13, wherein the plurality of pieces of text data is used for generating a file name of a file including the acquired image, and the different characters are used for a rule of the file name.

\* \* \* \* \*